US011228366B2

(12) United States Patent
Yamagishi et al.

(10) Patent No.: US 11,228,366 B2
(45) Date of Patent: Jan. 18, 2022

(54) OPTICAL TRANSMISSION CHARACTERISTICS ESTIMATION METHOD, OPTICAL TRANSMISSION CHARACTERISTICS ESTIMATION SYSTEM, AND OPTICAL TRANSMISSION CHARACTERISTICS COMPENSATION SYSTEM

(71) Applicants: NTT Electronics Corporation, Yokohama (JP); NIPPON TELEGRAPH AND TELEPHONE CORPORATION, Tokyo (JP)

(72) Inventors: Akihiro Yamagishi, Kanagawa (JP); Atsushi Hoki, Kanagawa (JP); Masayuki Sugasawa, Kanagawa (JP); Masanori Nakamura, Tokyo (JP); Asuka Matsushita, Tokyo (JP)

(73) Assignees: NTT ELECTRONICS CORPORATION, Yokohama (JP); NIPPON TELEGRAPH AND TELEPHONE CORPORATION, Tokyo (JP)

(*) Notice: Subject to any disclaimer, the term of this patent is extended or adjusted under 35 U.S.C. 154(b) by 0 days.

(21) Appl. No.: 17/269,023

(22) PCT Filed: Feb. 3, 2020

(86) PCT No.: PCT/JP2020/003971
§ 371 (c)(1),
(2) Date: Feb. 17, 2021

(87) PCT Pub. No.: WO2020/175026
PCT Pub. Date: Sep. 3, 2020

(65) Prior Publication Data
US 2021/0328666 A1 Oct. 21, 2021

(30) Foreign Application Priority Data

Feb. 28, 2019 (JP) .............................. JP2019-036134

(51) Int. Cl.
H04B 10/071 (2013.01)
H04B 10/50 (2013.01)
(Continued)

(52) U.S. Cl.
CPC ......... H04B 10/071 (2013.01); H04B 10/503 (2013.01); H04B 10/588 (2013.01); H04B 10/61 (2013.01)

(58) Field of Classification Search
None
See application file for complete search history.

(56) References Cited

U.S. PATENT DOCUMENTS 4,800,555 A * 1/1989 Foschini ................ H04B 10/50
398/95
2014/0169802 A1 * 6/2014 Magri .............. H04B 10/50572
398/183

(Continued)

FOREIGN PATENT DOCUMENTS

JP 2018-152744 A 9/2018
JP 6428881 B1 11/2018

Primary Examiner — Darren E Wolf
(74) Attorney, Agent, or Firm — Myers Wolin, LLC

(57) ABSTRACT

A process of estimating a transfer function or an inverse transfer function of the optical transmitter from first data obtained by the optical receiver when a first known signal is transmitted from the transmitter to the receiver, and a temporary transfer function or a temporary inverse transfer function of the optical receiver, is performed for multiple frequency offsets between the optical transmitter and the optical receiver. At this time, the transfer function or the inverse transfer function of the optical transmitter is estimated by comparing the first data obtained by compensating (Continued)

at least one or none of a temporary transfer function of the optical receiver and transmission path characteristics detected in the receiver, with a first known signal before transmission to which what is not compensated for the first data between the temporary transfer function of the optical receiver and the transmission path characteristic is added.

18 Claims, 11 Drawing Sheets

(51) Int. Cl.
    *H04B 10/588*    (2013.01)
    *H04B 10/61*    (2013.01)

(56) References Cited

U.S. PATENT DOCUMENTS

| | | | |
|---|---|---|---|
| 2015/0117869 A1* | 4/2015 | Wakayama | H04B 10/5055 |
| | | | 398/185 |
| 2017/0244489 A1* | 8/2017 | Zhuge | H04B 10/5561 |
| 2018/0138980 A1* | 5/2018 | Jiang | H04B 10/572 |
| 2020/0036440 A1* | 1/2020 | Yamagishi | H04B 10/40 |

\* cited by examiner

OPTICAL TRANSMISSION CHARACTERISTICS ESTIMATION METHOD, OPTICAL TRANSMISSION CHARACTERISTICS ESTIMATION SYSTEM, AND OPTICAL TRANSMISSION CHARACTERISTICS COMPENSATION SYSTEM

CROSS-REFERENCE TO RELATED APPLICATION

This application is a national stage application of International Application No. PCT/JP2020/003971, filed on Feb. 3, 2020 and designated the U.S., which claims priority to Japanese Patent Application No. 2019-036134, filed on Feb. 28, 2019. The contents of each are herein incorporated by reference.

FIELD

The present disclosure relates to an optical transmission characteristics estimation method, an optical transmission characteristics estimation system, and an optical transmission characteristics compensation system that estimate or compensate the transmission characteristics of an optical transceiver in optical communication.

BACKGROUND

In digital coherent optical communication, distortions of signals caused in an optical transmitter, an optical fiber transmission path, and an optical receiver are compensated by digital signal processing. This enables large-scale transmission of several tens of gigabits per second or higher, and long-distance transmission with the reduced number of relays in transmission is achieved. Not only QPSK, but also high multi-level modulation, such as of 16QAM or 256QAM, can be applied to the signal modification scheme. Accordingly, the transmission rate can be largely increased.

With increase in transmission rate and multi-level modulation, the optical transceiver is required to have satisfactory transmission characteristics in a broadband. The transmission characteristics of a transmission signal in the optical transceiver are represented by a transfer function, and are compensated in each compensation circuit. With increase in transmission rate, there is a need for improvement in compensation accuracy.

Furthermore, it is also important to compensate in advance the transmission characteristics of the optical transmitter or the optical receiver prior to service. This is a calibration operation. By improving the accuracy of the calibration operation, compensation accuracy during service can be improved, and further increase in scale can be achieved.

In a conventional calibration method prior to service of coherent optical communication, first, white noise having uniform spectrum, such as ASE, is input into the optical receiver, a temporary transfer function is obtained from an output signal thereof. Next, a known signal is transmitted from the optical transmitter, the transmission characteristics of an optical fiber is estimated from a signal having passed through the optical fiber and the optical receiver. The transmission characteristics and the obtained transfer function of the optical receiver are compensated, and the transfer function of the optical transmitter is obtained. Next, the known signal is transmitted from the optical transmitter, the transmission characteristics of the optical fiber and the estimated transfer function of the optical transmitter are compensated from the signal having passed through the optical fiber and the optical receiver, and the true transfer function of the optical receiver is obtained. Finally, the estimated transfer function of the optical transmitter and the true transfer function of the optical receiver are set in the compensation circuits, thereby compensating the transmission characteristics of the optical transmitter and the optical receiver (for example, see PTLs 1 and 2). Accordingly, the transmission characteristics of the transmission path can be accurately obtained, and the transmission characteristics can be further improved by the compensation.

CITATION LIST

Patent Literature

[PTL 1] Japanese Laid-Open Patent Publication No. 2018-152744
[PTL 2] Japanese Patent No. 6428881

Technical Problem

Even in a case where a frequency offset is present between the optical transmitter and the optical receiver, the transmission characteristics of the optical transmitter and the optical receiver can be compensated. However, there has been a problem in that if the frequency offset varies between calibration and service owing to time-dependent deterioration or the fluctuation of laser frequency, the transmission characteristics cannot satisfactorily be estimated or compensated.

An object of the present disclosure, which has been made in order to solve the problem as described above, is to obtain an optical transmission characteristics estimation method, an optical transmission characteristics estimation system, and an optical transmission characteristics compensation system that can satisfactorily estimate or compensate the transmission characteristics even if the frequency offset varies between calibration and service.

Solution to Problem

An optical transmission characteristics estimation method according to the present disclosure estimating transmission characteristics of an optical transmitter of a transmission unit and an optical receiver of a reception unit connected to each other via an optical transmission path by an optical transmission characteristics and wherein carrier frequency of at least one of the optical transmitter and the optical receiver is variable, includes: a first step of performing a process of estimating a transfer function or an inverse transfer function of the optical transmitter, from first data obtained by the optical receiver when a first known signal is transmitted from the transmission unit to the reception unit, and a temporary transfer function or a temporary inverse transfer function of the optical receiver, for multiple frequency offsets between the optical transmitter and the optical receiver; and a second step of obtaining an average transfer function or an average inverse transfer function of the optical transmitter by averaging the transfer functions or the inverse transfer functions of the optical transmitter estimated for the multiple frequency offsets, or averaging and exponentially representing phase characteristics $\Phi(s)$ of the transfer functions or the inverse transfer functions of the optical transmitter estimated for the multiple frequency offsets where s represents a variable indicating frequency,

|T(s)| represents an amplitude component of a transfer function of the optical transmitter, Φ(s) represents phase characteristics, and |T(s)|×exp(jΦ(s)) represents the transfer function of the optical transmitter, wherein in the first step, the transfer function or the inverse transfer function of the optical transmitter is estimated by comparing the first data obtained by compensating at least one or none of a temporary transfer function of the optical receiver and transmission path characteristics detected in the reception unit, with a first known signal before transmission to which what is not compensated for the first data between the temporary transfer function of the optical receiver and the transmission path characteristic is added.

Advantageous Effects of Invention

In the present disclosure, even if the frequency offset varies between calibration and service owing to time-dependent deterioration or the fluctuation of laser frequency, the transmission characteristics can be satisfactorily estimated or compensated.

DESCRIPTION OF EMBODIMENTS

An optical transmission characteristics estimation method, an optical transmission characteristics compensation method, an optical transmission characteristics estimation system, and an optical transmission characteristics compensation system according to embodiments of the present disclosure are described with reference to the drawings. The same or corresponding configuration elements are assigned the same reference signs, and repetition of description is sometimes omitted. Note that the term "transfer function" as used below is not limited to a predetermined function that represents the transmission characteristics of a device, components, a propagation path and the like, and may be anything only if it is a function, a mathematical expression, a circuit, a line or the like that represents the transmission characteristics between certain two points. The transfer function is not limited to linear one, and may be a function or the like representing nonlinear characteristics. Furthermore, "transmission" and "transfer" are grasped to basically have the same meaning in the scope of the present disclosure.

Figure 1:
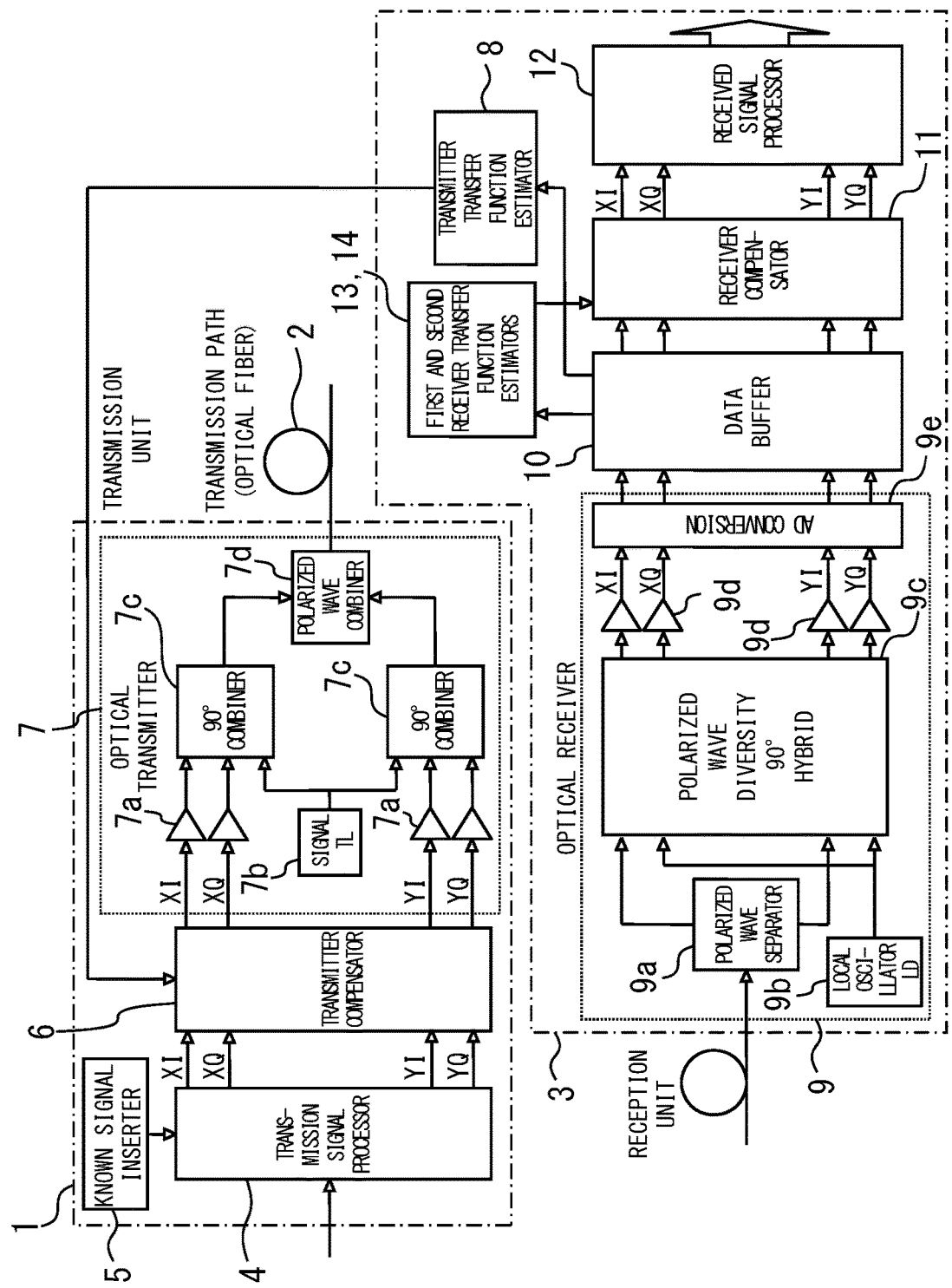
FIG. 1 shows an optical transceiver that includes an optical transmission characteristics estimation system and an optical transmission characteristics compensation system according to an embodiment of the present disclosure.

FIG. 1 shows an optical transceiver that includes an optical transmission characteristics estimation system and an optical transmission characteristics compensation system according to an embodiment of the present disclosure. A transmission unit 1 transmits an optical signal to a reception unit 3 via a transmission path 2. The transmission path 2 includes, for example, an optical fiber, and an optical amplifier.

The transmission unit 1 includes a transmission signal processor 4, a known signal inserter 5, a transmitter compensator 6, and an optical transmitter 7. A part or the entire parts of each of the transmission signal processor 4, the known signal inserter 5 and the transmitter compensator 6 can be made up of hardware, such as ASIC (Application Specific Integrated Circuit) or FPGA (Field-Programmable Gate Array), for example. A part or the entire thereof may be made up of software that functions by a processor, such as CPU (Central Processing Unit), executing a program stored in a storage.

The known signal inserter 5 inserts a series of known signals into each of modulation target signal series, which are an XI lane (first lane), an XQ lane (second lane), a YI lane (third lane) and a YQ lane (fourth lane), generated by the transmission signal processor 4. The series of known signals is shared between the transmission unit 1 and the reception unit 3. The known signal can be made up of predetermined bits or symbols and, for example, is made up of a signal series having about 2000 symbols. The length of the known signal is at least required to be greater than the FIR filter length to be calculated.

The transmission signal processor 4 generates frame data based on a transmission data series. The frame data is a signal series (modulation target signal series) for applying a modulation process in the optical transmitter 7. The transmission signal processor 4 transmits, to the transmitter compensator 6, frame data into which the known signal series has been inserted.

The transmitter compensator 6 obtains an estimation result of the transfer function of the optical transmitter 7, from an after-mentioned transmitter transfer function estimator 8 of the reception unit 3. The transmitter compensator 6 compensates the transfer functions of the XI lane, the XQ lane, the YI lane and the YQ lane of the optical transmitter 7, and differences between the lanes, based on the estimation result. The transmitter compensator 6 can be made up of, for example, a digital filter, such as an FIR (Finite Impulse Response) filter, and may be made up of an analog filter or the like instead. The transmitter compensator 6 may include a function section that has a function of individually compensating delay time differences between the four lanes.

The optical transmitter 7 modulates orthogonal linear polarizations with the compensated frame data, thereby generating an optical signal of the modulation target signal series. The optical transmitter 7 includes a driver amplifier 7a, a tunable laser 7b (signal TL), a 90° combiner 7c, and a polarized wave combiner 7d. The driver amplifier 7a amplifies an electric signal of compensated frame data so as to have an appropriate amplitude, and transmits the signal to the 90° combiner 7c. The 90° combiner 7c is a Mach-Zehnder vector modulator, separates linearly polarized CW (Continuous Wave) light transmitted from the tunable laser 7b, into orthogonal linear polarizations, and modulates each linear polarization with the frame data, thereby generating an optical signal of the modulation target signal series. The horizontally-polarized-wave optical signal and the vertically-polarized-wave optical signal are combined by the polarized wave combiner 7d, and are supplied to the reception unit 3 through the transmission path 2.

The reception unit 3 includes an optical receiver 9, a data buffer 10, a receiver compensator 11, a received signal processor 12, first and second receiver transfer function estimators 13 and 14, and a transmitter transfer function estimator 8. The first and second receiver transfer function estimators 13 and 14, and the transmitter transfer function estimator 8 constitute an optical transmission characteristics estimation system that estimates the optical transmission characteristics of the optical transceiver. The optical transmission characteristics estimation system, and the transmitter compensator 6 and the receiver compensator 11 constitute an optical transmission characteristics compensation system that compensates the optical transmission characteristics of the optical transceiver. Note that FIG. 1 represents the transmitter compensator 6 and the receiver compensator 11 by individual blocks. The transmitter compensator 6 may be a part of the transmission signal processor 4. The receiver compensator 11 may be a part of the received signal processor 12.

The optical receiver 9 includes a polarized wave separator 9a, a laser module 9b (local oscillator LD), a polarized wave diversity 90° hybrid 9c, a photodiode (PD: Photo Diode) (not shown), a TIA 9d (Transimpedance Amplifier), and an A/D converter 9e.

The laser module 9b transmits the linearly polarized CW light to the polarized wave diversity 90° hybrid 9c. The polarized wave diversity 90° hybrid 9c causes the received optical signal and the CW light to interfere with each other. The photodiode photoelectrically converts it. The TIA 9d converts the current signal into a voltage signal. The A/D converter 9e A/D-converts the voltage signal. Accordingly, the received optical signal is converted into a baseband digital signal.

Some or all of the A/D converter 9e of the optical receiver 9, the data buffer 10, the receiver compensator 11, the received signal processor 12, the first and second receiver transfer function estimators 13 and 14, and the transmitter transfer function estimator 8 can be made up of hardware, such as an ASIC or an FPGA, for example. A part or the entire thereof may be made up of software functioning by a processor, such as CPU, executing a program stored in a storage. The first and second receiver transfer function estimators 13 and 14, and the transmitter transfer function estimator 8 are made up of external devices independent of the optical transceiver; the external devices are PCs or devices corresponding thereto, for example. The received signal processor 12 can have functions similar to those of the first and second receiver transfer function estimators 13 and 14 and the transmitter transfer function estimator 8, and can be used in a shared manner.

The data buffer 10 can generally be made up of a memory circuit (RAM), and temporarily accumulates data obtained by A/D-converting the signal received by the optical receiver 9. The data accumulated in the data buffer 10 is sequentially transmitted to the receiver compensator 11 and the received signal processor 12 on a following stage. The data can also be captured by the first and second receiver transfer function estimators 13 and 14, and the transmitter transfer function estimator 8. Note that without use of the data buffer 10, the first and second receiver transfer function estimators 13 and 14 and the transmitter transfer function estimator 8 may directly obtain the A/D-converted data in real time. Subsequently, all the examples of describing with using the digital data in the data buffer 10 include a method of directly obtaining reception data in real time.

The receiver compensator 11 obtains an estimation result of the transfer function of the optical receiver 9 from the second receiver transfer function estimator 14, and compensates the transfer functions of the XI lane, the XQ lane, the YI lane and the YQ lane of the optical receiver 9, and differences between lanes thereof, based on the estimation result. The receiver compensator 11 can be made up of a digital filter, such as an FIR filter, for example. The receiver compensator 11 may include a function section that has a function of individually compensating delay time differences between the four lanes.

The digital signal is input into the received signal processor 12 from the receiver compensator 11. For example, on the transmission path 2, a waveform distortion is caused by chromatic dispersion, polarization mode dispersion, polarization variation, or nonlinear optical effects. The received signal processor 12 compensates the waveform distortion caused on the transmission path 2. The received signal processor 12 compensates the difference between the frequency of light of the tunable laser 7b of the optical transmitter 7, and the frequency of local oscillator light of the laser module 9b of the optical receiver 9. Furthermore, the received signal processor 12 compensates phase noise according to the linewidth of light of the tunable laser 7b of the optical transmitter 7, and the linewidth of the local oscillator light of the laser module 9b of the optical receiver 9.

The first receiver transfer function estimator 13 estimates the temporary transfer function or inverse transfer function of the optical receiver 9, from the digital data obtained by the reception unit 3 when the ASE (Amplified Spontaneous Emission) signal corresponding to white noise enters an input end of the optical receiver 9. Accordingly, the temporary transfer function or inverse transfer function of the optical receiver 9 can be estimated only by the reception unit 3. The ASE signal can be generated from an optical amplifier. In a case of only outputting ASE, the optical amplifier is used in a state where nothing is input. The optical amplifier may be separately prepared. Alternatively, the optical amplifier in the transmission path 2 may be used. Since the spectrum (frequency characteristics) of the ASE signal is uniform, insertion of the signal allows the frequency characteristics to be obtained. Consequently, in a state where the ASE signal is input, the data stored in the data buffer 10 is captured by the first receiver transfer function estimator 13, thereby allowing the frequency characteristics to be estimated. The characteristics can be estimated on a lane-by-lane basis. A configuration example of the first receiver transfer function estimator 13 is described later.

The frequency characteristics are estimated as the transfer function by Fourier-transforming the digital data. Furthermore, a method of obtaining the inverse transfer function may not only be calculation of a reciprocal but also a method of obtaining the solution of an adaptive filter. The methods of obtaining the solution of the adaptive filter include a method of generally obtaining a Winner solution, and an obtaining method by an LMS (least mean square) algorithm or an RLS (recursive least square) algorithm. Here, the transfer function is relatively temporally invariable. Accordingly, "adaptive" does not mean temporal correspondence. Hereinafter, "adaptive" means adaptivity to a feedback circuit for obtaining a convergent solution. A detailed configuration example of the first receiver transfer function estimator 13 is described later. Note that in the above description, the ASE signal is used, but there is no limitation to the ASE signal. Any test signal can be used only if the signal has a known spectrum.

The transmitter transfer function estimator 8 estimates the transfer function or the inverse transfer function of the optical transmitter 7, from first digital data obtained by the reception unit 3 when a first known signal is transmitted from the transmission unit 1 to the reception unit 3, and the temporary transfer function or inverse transfer function of the optical receiver 9 of the reception unit 3. Specifically, the first known signal is extracted from the first digital data, and the transmission characteristics of the transmission path detected therefrom are compensated. Furthermore, with the temporary transfer function estimated by the first receiver transfer function estimator 13, the transmission characteristics of the optical receiver 9 are compensated. Furthermore, the transfer function of the optical transmitter 7 is estimated using the digital filter, such as an adaptive filter. For example, the adaptive filter is a filter based on the LMS algorithm, or a filter based on the RMS algorithm. That is, the transmitter transfer function estimator 8 inputs the first known signal having a remaining effect of the transfer function of the optical transmitter 7 into the digital filter, and estimates the transfer function or the inverse transfer function of the optical transmitter 7 as the filter coefficient of the digital filter in a case of convergence with the error between the first known signal input and the original first known signal, i.e., the first known signal before transmission, being minimized. As described later, the transfer function or the inverse transfer function of the optical transmitter 7 estimated for multiple frequency offsets or the phase characteristics thereof are averaged, thus obtaining the average transfer function or the average inverse transfer function of the optical transmitter 7.

The second receiver transfer function estimator 14 estimates the true transfer function or inverse transfer function of the optical receiver 9, from second digital data obtained by the reception unit 3 when a second known signal is transmitted to the reception unit 3 from the transmission unit 1 where the transmission characteristics of the optical transmitter 7 is compensated using the average transfer function or the average inverse transfer function of the optical transmitter 7, and the estimated transfer function or inverse transfer function of the optical transmitter 7. An estimation method estimates the inverse transfer function of the optical receiver 9 using the digital filter, such as an adaptive filter, for example. For example, the adaptive filter is a filter based on the LMS algorithm, or a filter based on the RLS algorithm. Also in this case, estimation can be made on a lane-by-lane basis. That is, the second receiver transfer function estimator 14 inputs the second known signal into the digital filter, and estimates the transfer function or the inverse transfer function of the optical receiver 9 as the filter coefficient of the digital filter in a case of convergence with the error between the output of the digital filter and the signal obtained by adding the transmission path characteristics to the second known signal before transmission being minimized.

Figure 2:
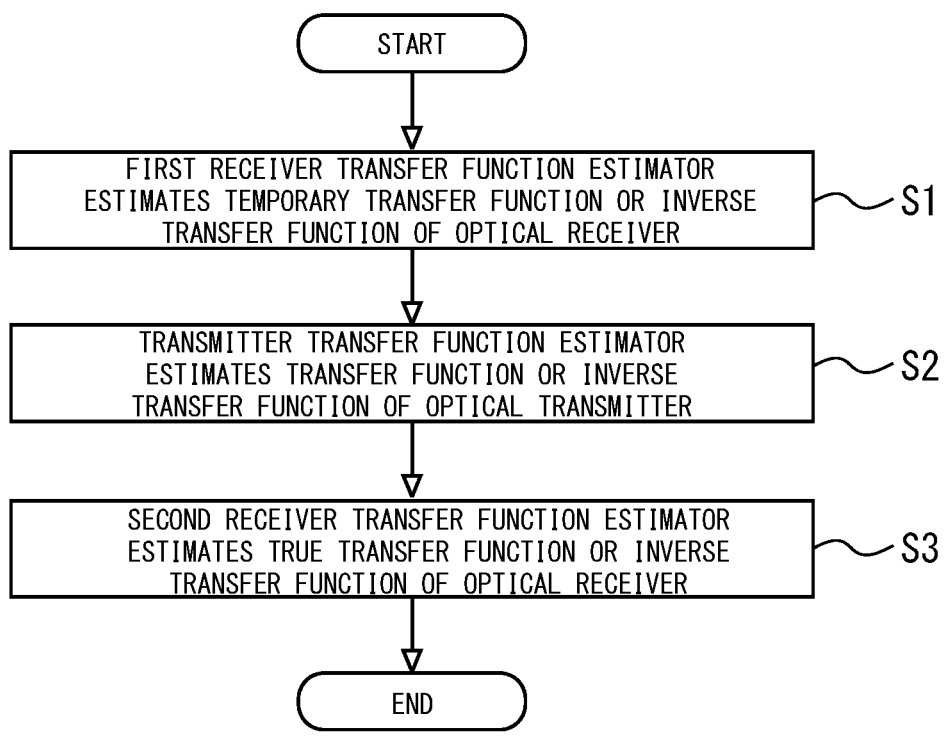
FIG. 2 is a flowchart showing an optical transmission characteristics estimation method according to the embodiment of the present disclosure.

Subsequently, a method of the optical transmission characteristics estimation system estimating the optical transmission characteristics of the optical transceiver according to this embodiment is described with reference to the drawings. FIG. 2 is a flowchart showing an optical transmission characteristics estimation method according to the embodiment of the present disclosure. First, the first receiver transfer function estimator 13 estimates the temporary transfer function or inverse transfer function of the optical receiver 9 (step S1). Next, the transmitter transfer function estimator 8 estimates the transfer function or the inverse transfer function of the optical transmitter 7 (step S2). Next, the second receiver transfer function estimator 14 estimates the true transfer function or inverse transfer function of the optical receiver 9 (step S3).

Figure 3:
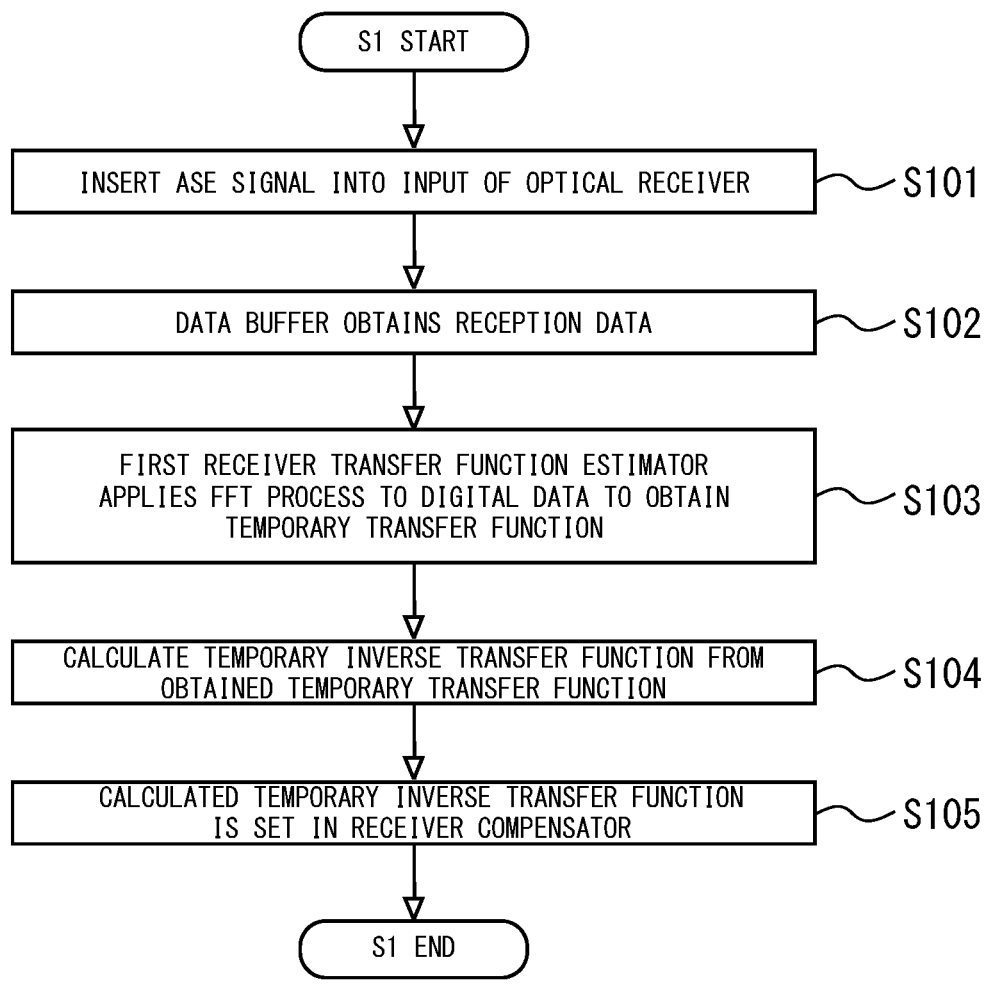
FIG. 3 is a flowchart of estimating the temporary transfer function of the optical receiver according to the embodiment of the present disclosure.

Subsequently, detailed operations of the respective steps are described. FIG. 3 is a flowchart of estimating the temporary transfer function of the optical receiver according to the embodiment of the present disclosure. First, an ASE signal having a uniform spectrum is inserted into an input of the optical receiver 9 (step S101). By inserting the ASE signal, the frequency characteristics can be obtained. Next, in a state where the ASE signal is input, the data buffer 10 obtains reception data (step S102). Next, the first receiver transfer function estimator 13 acquires digital data from the data buffer 10, and applies an FFT (fast Fourier transform) process to obtain a temporary transfer function (step S103). The ASE signal does not have fixed phase characteristics. Consequently, the calculated temporary transfer function is only for an amplitude characteristics component in the transfer function of the optical receiver 9 (corresponding to the absolute value of the transfer function).

Next, from the obtained temporary transfer function, a temporary inverse transfer function is calculated (step S104). Next, the calculated temporary inverse transfer function is set in the receiver compensator 11 (step S105). Note that the calculated inverse transfer function is not necessarily required to be set in the receiver compensator 11 when the transfer function is estimated, but is used for calculation of estimating the transfer function of the optical transmitter in the transmitter transfer function estimator 8, which is described later.

Figure 4:
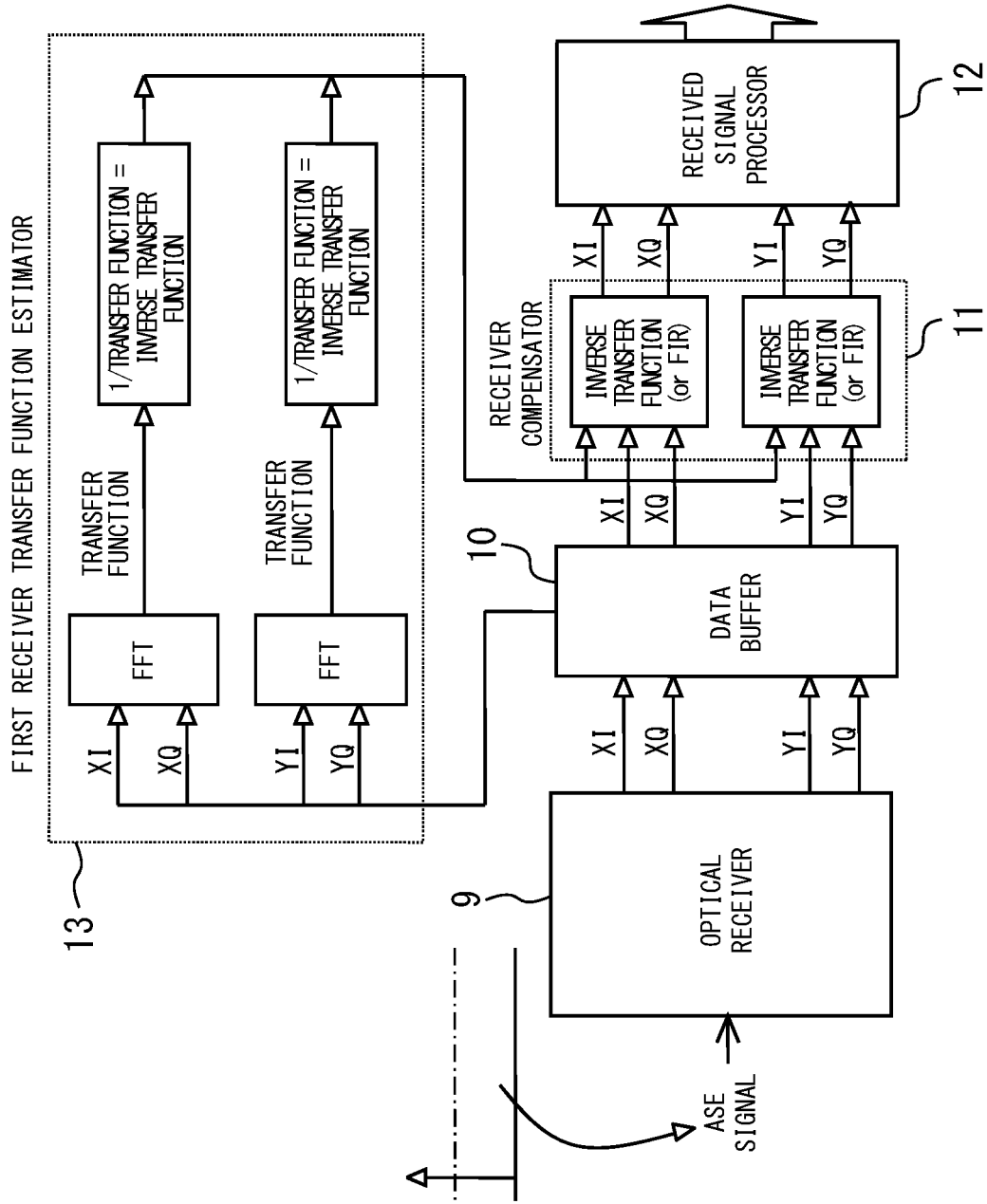
FIG. 4 shows the first receiver transfer function estimator according to the embodiment of the present disclosure.

FIG. 4 shows the first receiver transfer function estimator according to the embodiment of the present disclosure. The first receiver transfer function estimator 13 includes: FFT that applies an FFT process to an X-polarized wave received signal and a Y-polarized wave received signal respectively; and a circuit that applies a 1/transfer function process to outputs thereof and calculates the inverse transfer function respectively. Note that the X-polarized wave received signal is XI+jXQ, and the Y-polarized wave received signal is YI+jYQ. A case with no delay difference between XI and XQ and between YI and YQ is assumed. In a case with a delay difference, XI, XQ, YI and YQ can be individually subjected to Fourier transform and the 1/transfer function process. Note that only if the Fourier transform is possible, the process is not necessarily limited to the FFT process. Another method may be adopted. The representation of "FFT" hereafter means a function of Fourier transform.

The digital data obtained in the data buffer 10 is time-domain data. Accordingly, through each of the X-polarized and Y-polarized wave lanes, the data is converted by the FFT process into frequency-domain data.

$$X_R(k) = FFT[x_R(n)] = \sum_{n=0}^{N-1} x_R(n) e^{-j\frac{2\pi}{N}nk} \qquad \text{[Math. 1]}$$

Figure 9:
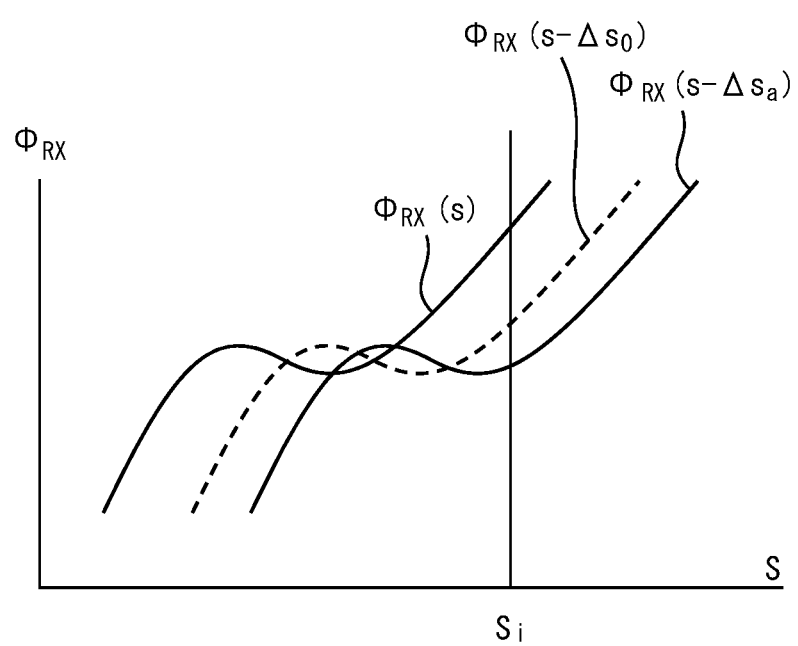
FIG. 9 is a diagram for illustrating the effects of the phase characteristics of the transfer function of the optical receiver.

$x_R(n)$ is digital data obtained in the data buffer 10. $X_R(k)$ is FFT-processed data. FFT means a high-speed process of DFT (Discrete Furrier Transfer). A typical FFT process for continuous signal is applied to each of a finite number N of data items. It is a matter of course that the data is processed in an overlapping manner between adjacent processes (there are overlap-add and overlap-save methods and the like). The same applies also to the following FFT process. The absolute value of $X_R(k)$ indicates amplitude information, and is obtained as a temporary transfer function. Calculation of the reciprocal thereof can obtain a temporary inverse transfer function. The inverse transfer function can be set in the receiver compensator 11. The inverse transfer function is also used to estimate the transfer function of the optical transmitter 7. In this case, the inverse transfer function of the temporary transfer function is not necessarily required to be set in the receiver compensator 11. As shown in FIG. 9 in PTL 1, the first receiver transfer function estimator 13 can also be configured by adopting the adaptive filter. In this case, when a test signal having a known spectrum is input into an input end of the optical receiver 9, the first receiver transfer function estimator 13 Fourier-transforms data output from the optical receiver 9 to estimate the temporary transfer function of the optical receiver 9. A signal having any waveform is multiplied by the temporary transfer function of the optical receiver 9 and is input into the adaptive filter. The time response of the temporary inverse transfer function of the optical receiver 9 is obtained as the filter coefficient of an FIR filter constituting the adaptive filter in a case of convergence with the square error between the output of the adaptive filter (digital filter) and the original signal having any waveform being minimized. Fourier-transform of the filter coefficient or the time response serves as the temporary inverse transfer function of the optical receiver 9.

Figure 5:
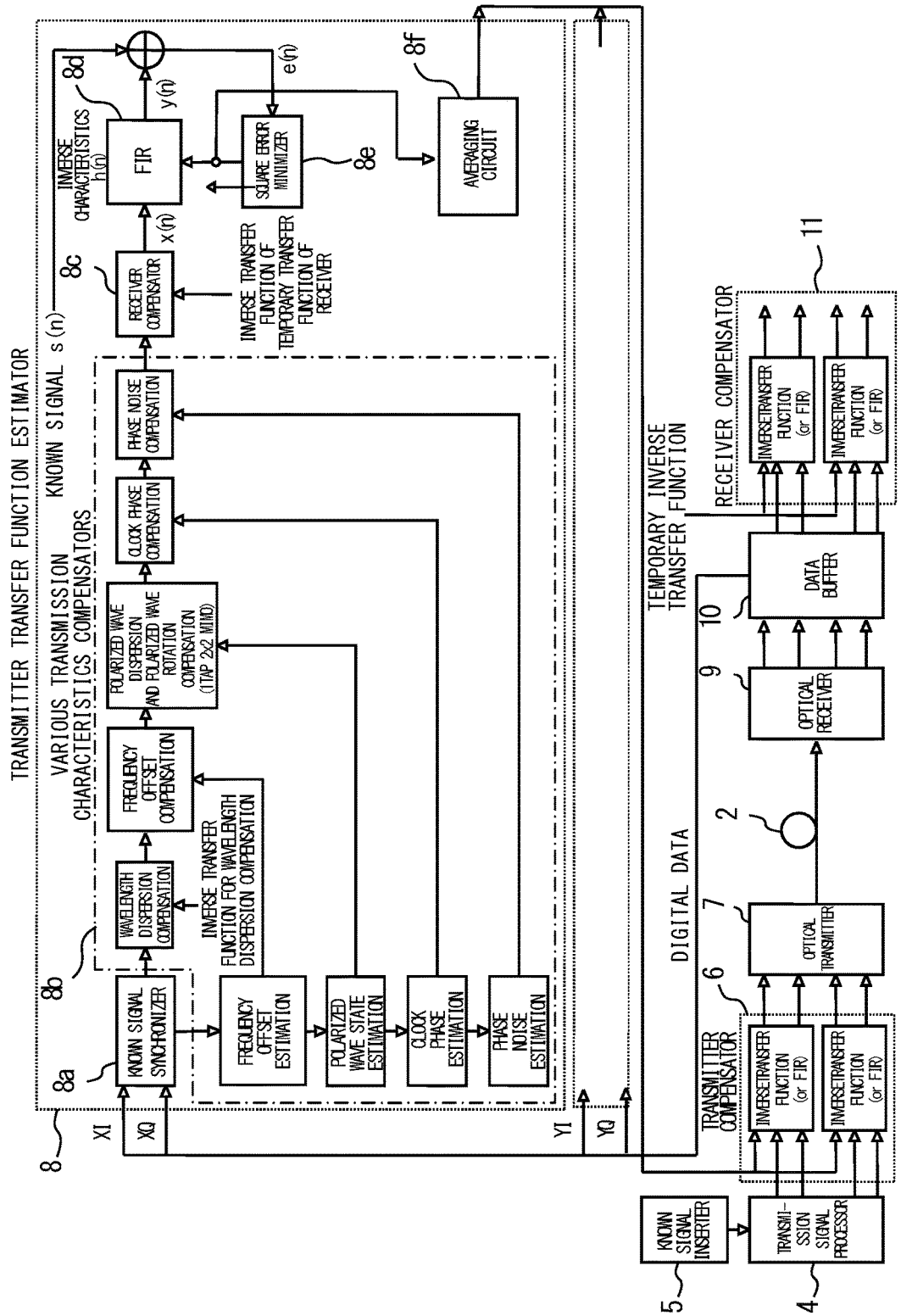
FIG. 5 shows the transmitter transfer function estimator according to the embodiment of the present disclosure.

FIG. 5 shows the transmitter transfer function estimator according to the embodiment of the present disclosure. The transmitter transfer function estimator 8 includes: a known signal synchronizer 8a; various transmission characteristics compensators 8b, a receiver compensator 8c, an adaptive filter that includes an FIR filter 8d and a square error minimizer 8e; and an averaging circuit 8f. The various transmission characteristics compensators 8b includes various compensation circuits that compensate the distortion during transmission, such as chromatic dispersion compensation, frequency offset compensation, polarization dispersion and polarization rotation compensation, clock phase compensation, and phase noise compensation. Note that the known signal synchronizer 8a has a function of extracting a known signal from digital data. From the state of the extracted known signal, compensation data items to be set in the subsequent various transmission characteristics compensators are respectively estimated in estimation blocks. That is, estimation of the transfer function or the inverse transfer function of the optical transmitter 7 includes a process of estimating the transmission characteristics of the transmission path 2. Note that the receiver compensator 8c can also be arranged on a previous stage of the various transmission characteristics compensators 8b.

The chromatic dispersion compensator can be arranged on a previous stage of the known signal synchronizer 8a. The order of the compensators of the various transmission characteristics compensators can be changed. The polarization dispersion and polarization rotation compensation's (1TAP 2×2MIMO (Multi Input Multi Output)) means that the number of taps of the filter is configured to be one, the band characteristics of the optical transceiver are not compensated in this block, and only polarization rotation is performed (a typical multi-tap 2×2 MIMO filter also compensates the band).

Similar to the first receiver transfer function estimator 13 in FIG. 4, the transmitter transfer function estimator 8 processes X-polarized waves and Y-polarized waves as complex vector signals. However, the XI, XQ, YI and YQ lanes may be independently processed. In this case, the delay difference between the lanes can also be extracted and compensated. Processing the X-polarized waves as a complex vector signal assumes the delay difference (skew) between XI and XQ as zero. In a case where the delay difference cannot be ignored, the transfer function is required to be extracted and compensated on a lane-by-lane basis. This also applies to the Y-polarized waves.

Figure 6:
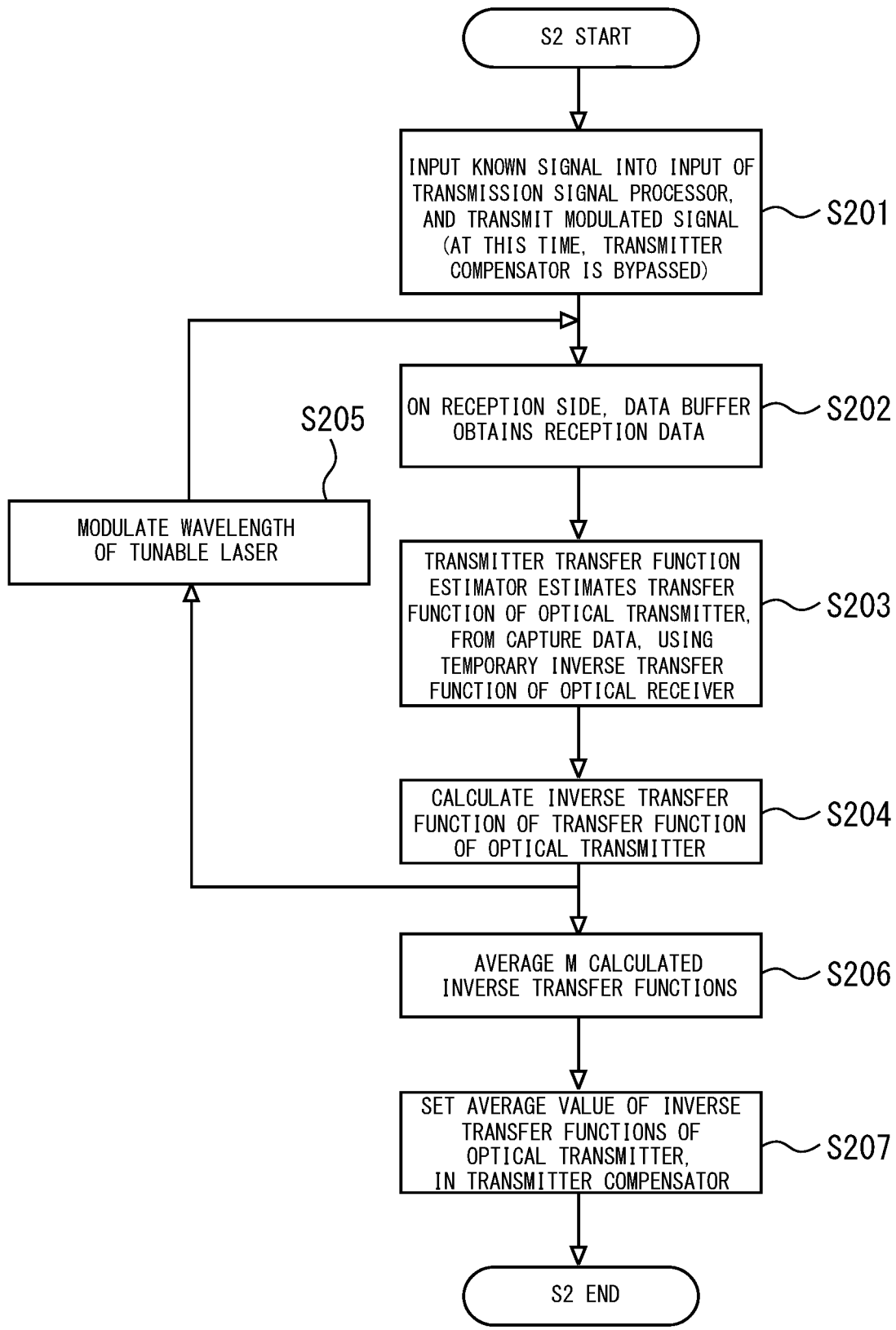
FIG. 6 is a flowchart of obtaining the transfer function or the inverse transfer function of the optical transmitter according to the embodiment of the present disclosure.

FIG. 6 is a flowchart of obtaining the transfer function or the inverse transfer function of the optical transmitter according to the embodiment of the present disclosure. First, the known signal is input into the input of the transmission signal processor 4, and an optically modulated signal is transmitted from the optical transmitter 7 (step S201). At this time, the transmitter compensator 6 is bypassed. Note that the transmitter compensator 6 can have the same configuration as the receiver compensator 11. Next, on the reception side, the reception data is obtained by the data buffer 10 (step S202). Next, the transmitter transfer function estimator 8 captures the digital data from the data buffer 10 (step S203). The known signal synchronizer 8a extracts the known signal from the captured digital data. Various transmission characteristics compensation, and optical receiver compensation are applied to the extracted known signal. The various transmission characteristics compensation includes transmission path characteristics compensation, such as frequency offset compensation, chromatic dispersion compensation, and polarization dispersion compensation. The optical receiver compensation is performed using the temporary inverse transfer function of the optical receiver 9 estimated in step S1. FIG. 5 shows the configuration of compensation with the temporary inverse transfer function in the receiver compensator 11 on the following stage of the data buffer 10. This compensation is not specifically required for the process of the transmitter transfer function estimator 8 described above.

Next, the transfer function of the optical transmitter is estimated using the adaptive filter. The adaptive filter is a filter of self-adapting the transfer function according to an optimization algorithm. A remaining effect of the transfer function of the optical transmitter 7 is in the known signal subjected to the various transmission characteristics compensation and the optical receiver compensation. Consequently, the signal is subjected to the FIR filter 8d where the inverse characteristics is set, as an adaptive filter. The inverse characteristics is corrected again so as to minimize the square of the difference between the output and the known signal before transmission. According to this process, the filter coefficient of the FIR filter 8d constituting the adaptive filter can be obtained as the time response of the inverse transfer function. The method of obtaining the inverse transfer function is typically known as the Winner solution or the LMS algorithm, as follows.

$$e(n) = s(n) - y(n) = s(n) - h(n)^T x(n)$$

$$h(n) = [x(n)^T x(n)]^{-1} x(n)^T s(n) \quad \text{WinerSolution}$$

$$h(n+1) = h(n) + \mu \cdot e(n) x(n) \quad LMS \qquad \text{[Math. 2]}$$

Here, s(n) is the known signal before transmission, y(n) is output of the adaptive filter, e(n) is the difference between s(n) and y(n), and h(n) is the time response of the adaptive filter.

In the example described above, the inverse transfer function of the optical transmitter 7 can be directly obtained by a circuit of adaptive equalization. Accordingly, steps S203 and S204 can be integrally processed. On the other hand, in a case where the transfer function of the optical transmitter 7 is obtained, the inverse transfer function is calculated (step S204).

At the start time point, the wavelength of the tunable laser 7b of the optical transmitter 7 conforms to the frequency $s_{TX}$ at the original time of design. Next, the wavelength of the tunable laser 7b of the optical transmitter 7 is changed to cause frequency shift, thus setting a frequency offset different from current one (step S205). Here, the frequency offset is the difference between the frequency of the signal TL in the optical transmitter 7 and the frequency of the local oscillator LD in the optical receiver 9.

In a state where the frequency offset different from the current one is set, steps S202 to S204 are re-executed. The wavelength of the tunable laser 7b is changed again in step S205, steps S202 to S204 are similarly repeated. As described above, the inverse transfer function of the optical transmitter 7 is calculated for the respective frequency offsets between transmission and reception. By repeating the operation described above M times, the inverse transfer functions at the M different frequencies can be estimated.

For the predetermined M frequency offsets, the inverse transfer functions of the optical transmitter are calculated, and the averaging circuit 8f calculates the average value thereof (step S206). The average value is adopted as the estimate value of the inverse transfer function of the optical transmitter 7 (average inverse transfer function), and is set in the transmitter compensator 6 (step S207). The setting method is the same as that indicated in step S105. At this time, as described above, the XI, XQ, YI and YQ lanes may be independently processed. In this case, the delay difference between the lanes can also be extracted and compensated. Note that in this embodiment, the time response of the inverse transfer function of the optical transmitter 7 is obtained as the filter coefficient to be set in the FIR filter 8d. Accordingly, the filter coefficient is averaged. The filter coefficient is the time response of the inverse transfer function. It is commonly known that the time response of averaging of frequency response (the relationship of inverse Fourier transform) is equal to the averaging of time response, and vice versa (the frequency response of the average time response (the relationship of Fourier transform)). Consequently, the frequency response may be averaged and be inverse-Fourier-transformed to obtain the time response.

In the operation of the transmitter transfer function estimator 8 described above, the extracted known signal is subjected to the various transmission characteristics compensation and the optical receiver compensation, and is further compared with the known signal before transmission, thus estimating the transfer function of the optical transmitter. That is, estimation of the transfer function of the optical transmitter from the extracted known signal only requires to remove the effects of the various transmission characteristics (transmission path characteristics), the transfer function of the optical receiver, and the known signal before transmission, by a certain method. For example, also by comparing the known signal before transmission to which the transmission path characteristics and the transfer function of the optical receiver are added, with the extracted known signal, the transfer function of the optical transmitter can be estimated.

The same applies also to a case in which the second receiver transfer function estimator 14 obtains the true transfer function of the optical receiver and which is described next. That is, estimation of the transfer function of the optical receiver from the extracted known signal only requires to remove the effects of the transfer function of the optical transmitter, the various transmission characteristics (transmission path characteristics), and the known signal before transmission, by a certain method. In an example described next, the known signal where the transfer function of the optical transmitter is compensated is compared with the known signal before transmission to which the transmission path characteristics are added, thus estimating the transfer function of the optical receiver. Alternatively, for the known signal where the transfer function of the optical transmitter is compensated, the transmission path characteristics are compensated, the compensated signal is compared with the known signal before transmission, thus allowing the transfer function of the optical receiver to be estimated.

In general, it is obvious for those skilled in the art that "compensation" can be achieved by division by the transfer function or multiplication by the inverse transfer function. In this specification, the compensation is used as certain means for "compensating the transfer function" and "removing the effect of the transfer function". Furthermore, in this specification, the term "transmission characteristics" has the same meaning as the term "transfer function".

Figure 7:
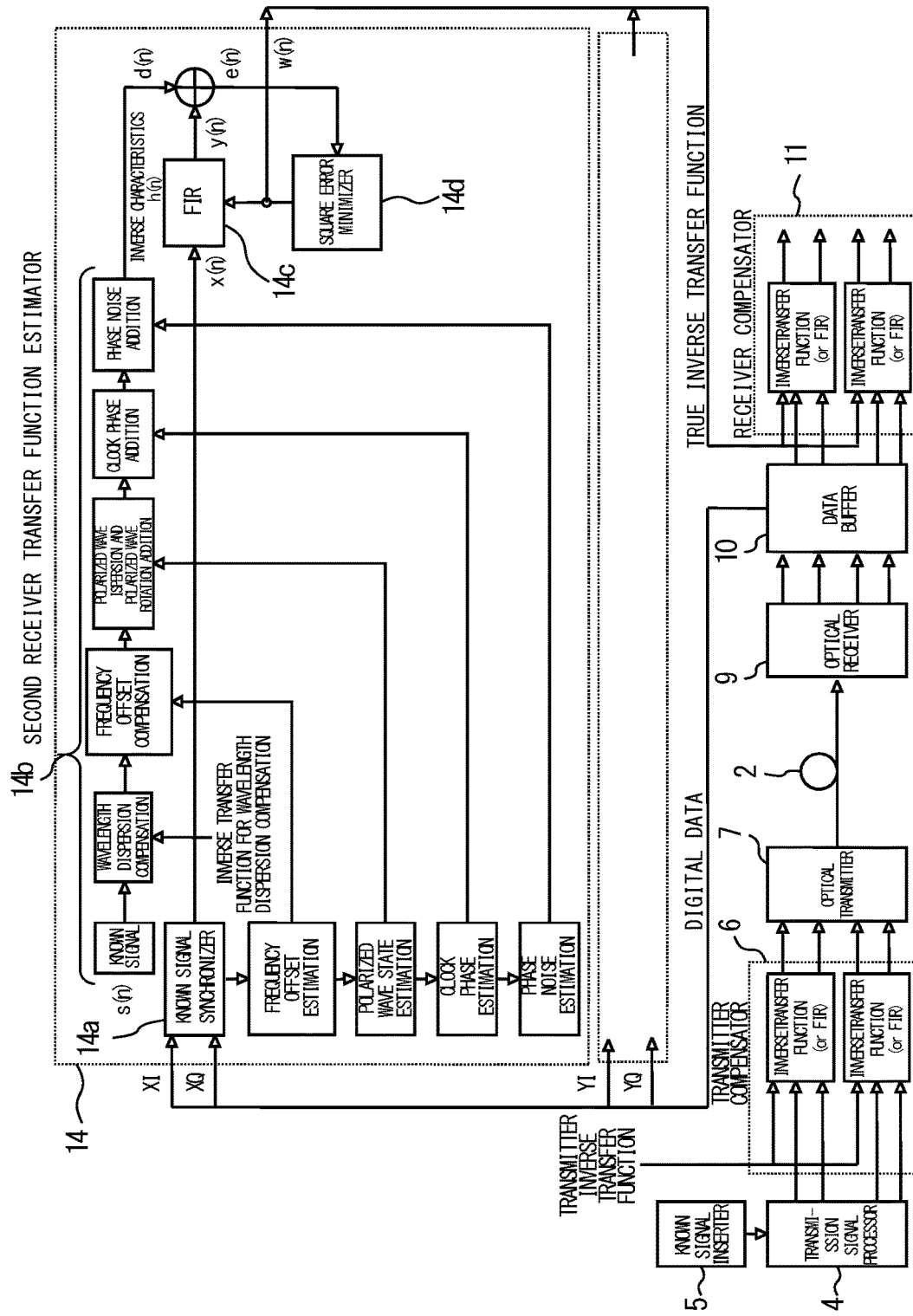
FIG. 7 shows the second receiver transfer function estimator according to the embodiment of the present disclosure.

FIG. 7 shows the second receiver transfer function estimator according to the embodiment of the present disclosure. The second receiver transfer function estimator 14 includes: a known signal synchronizer 14a; a circuit 14b simulating the distortion during transmission, such as of chromatic dispersion compensation, frequency offset compensation, polarization dispersion and polarization rotation addition, clock phase addition, and phase noise addition; an FIR filter 14c for adaptive equalization; and a square error minimization circuit 14d. The known signal synchronizer 14a has a function of extracting a known signal from digital data. From the state of the extracted known signal, additional data to be set in the following-stage circuit simulating the distortions is estimated in estimation blocks. That is, estimation of the transfer function or the inverse transfer function of the optical receiver 9 includes a process of estimating the transmission characteristics of the transmission path 2. The order in the circuit 14b simulating the distortion during transmission, such as of the chromatic dispersion compensation, frequency offset compensation, polarization dispersion and polarization rotation addition, clock phase addition, and phase noise addition, can be changed.

Similar to the case of the first receiver transfer function estimator 13, the second receiver transfer function estimator 14 processes X-polarized waves and Y-polarized waves as complex vector signals. However, the XI, XQ, YI and YQ lanes may be independently processed. In this case, the delay difference between the lanes can also be extracted and compensated. Processing the X-polarized waves as a complex vector signal assumes the delay difference between XI and XQ as zero. In a case where the delay difference cannot be ignored, the transfer function is required to be extracted and compensated on a lane-by-lane basis. This also applies to the Y-polarized waves.

Figure 8:
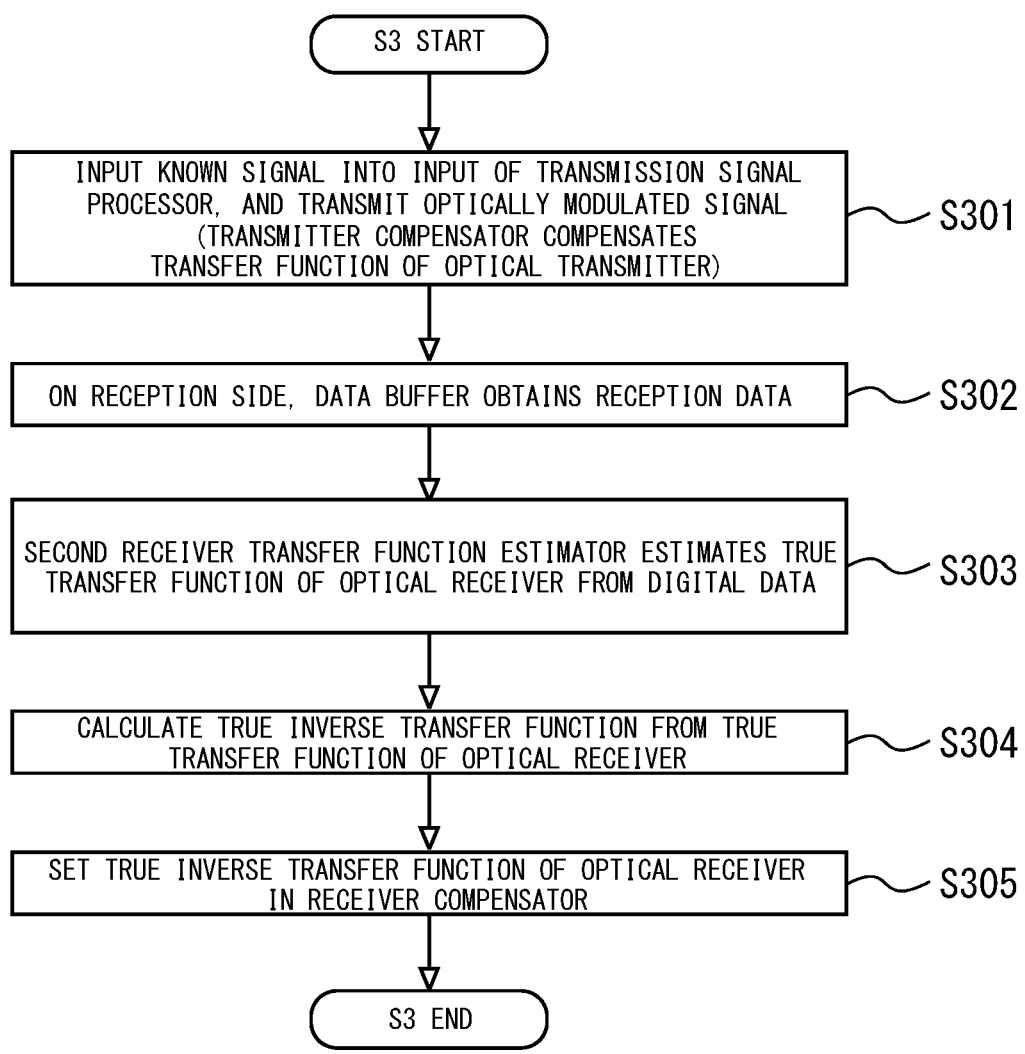
FIG. 8 is a flowchart of estimating the true transfer function or inverse transfer function of the optical receiver according to the embodiment of the present disclosure.

FIG. 8 is a flowchart of estimating the true transfer function or inverse transfer function of the optical receiver according to the embodiment of the present disclosure. First, the known signal is input into the input of the transmission signal processor 4, and an optically modulated signal is transmitted from the optical transmitter 7 of the transmission unit 1 to the reception unit 3 (S301). At this time, the average inverse transfer function of the optical transmitter 7 estimated by the transmitter transfer function estimator 8 described above is set in the transmitter compensator 6, and the transmission characteristics of the optical transmitter 7 are compensated. Note that the transmitter compensator 6 can have the same configuration as the receiver compensator 11.

Next, in the reception unit 3, the reception data is obtained by the data buffer 10 (step S302). The second receiver transfer function estimator 14 captures the digital data from the data buffer 10 (step S303). The known signal synchronizer 14a extracts the known signal from the captured digital data. The extracted known signal is supplied to the FIR filter 14c as an adaptive filter. On the other hand, the chromatic dispersion, frequency offset, polarization dispersion and polarization rotation, clock phase, and phase noise, which are estimated as the transmission path distortions, are added to the known signal before transmission, and the signal is compared with the output of the adaptive filter. The amounts of addition of the chromatic dispersion, frequency offset, polarization dispersion and polarization rotation, clock phase, and phase noise are estimated in various estimation blocks, from the state of the known signal.

Here, at the output of the adaptive filter, the transfer function of the optical transmitter 7 is assumed to be compensated by the transmitter compensator 6. If the transfer function of the optical receiver 9 is compensated by the adaptive filter, the output of the adaptive filter is only affected by the transmission path distortions. The signal is compared with the known signal to which the transmission path distortions are added, and the difference (square error) is minimized, which allows the filter coefficient of the FIR filter 14c, which is an adaptive filter, to be obtained as the time response of the inverse transfer function of the optical receiver 9. The method of obtaining the inverse transfer function is typically known as the Winner solution or the LMS algorithm, as follows.

$$e(n)=d(n)-y(n)=d(n)-h(n)^T x(n)$$

$$h(n)=[x(n)^T x(n)]^{-1} x(n)^T d(n) \text{ WinerSolution}$$

$$h(n+1)=h(n)+\mu \cdot e(n) \times (n) \text{ LMS} \quad \text{[Math. 3]}$$

Here, d(n) is the known signal to which the transmission path distortions are added, y(n) is output of the adaptive filter, e(n) is the difference between d(n) and y(n), and h(n) is the time response of the adaptive filter.

In the example described above, the true inverse transfer function of the optical receiver 9 can be directly obtained by a circuit of adaptive equalization. Accordingly, steps S303 and S304 can be integrally processed. On the other hand, in a case where the true transfer function of the optical receiver 9 is obtained, the true inverse transfer function is calculated from the transfer function (step S304).

Next, the estimated true inverse transfer function of the optical receiver 9 is set in the receiver compensator 11 (step S305). The setting method is the same as that indicated in step S105. At this time, as described above, the XI, XQ, YI and YQ lanes may be independently processed. In this case, the delay difference between the lanes can also be extracted and compensated. As described above, the second receiver transfer function estimator 14 can obtain the true transfer function or inverse transfer function of the optical receiver 9.

Subsequently, the operation of the optical transceiver according to this embodiment is described using mathematical expressions. In the following mathematical expressions, the variable indicating the frequency is represented as "s", and various signals and transfer functions are represented as functions of "s".

In general, the transfer function TX(s) of the optical transmitter 7, and the transfer function RX(s) of the optical receiver 9 are represented as the product of the amplitude component (the absolute value of the transfer function) and the phase component (exponential representation), as follows.

$$TX(s)=|TX(s)| \cdot e^{\wedge}[j\phi_{TX}(s)]$$

$$RX(s)=|RX(s)| \cdot e^{\wedge}[j\phi_{RX}(s)]$$

where |RX(s)| corresponds to the temporary transfer function RX_ASE(s) of the optical receiver 9 obtained by inputting the ASE signal, and $\phi_{TX}(s)$ is the phase characteristics of the transfer function of the optical transmitter 7, and $\phi_{RX}(s)$ is the phase characteristics of the transfer function of the optical receiver 9. "^" represents power.

The phase components can be represented by the following mathematical expression using trigonometric functions, using the phase characteristics.

$$e^{\wedge}[j\phi_{TX}(s)]=\cos(\phi_{TX}(s))+j \cdot \sin(\phi_{TX}(s))$$

$$e^{\wedge}[j\phi_{RX}(s)]=\cos(\phi_{RX}(s))+j \cdot \sin(\phi_{RX}(s))$$

The transfer function of the optical transmitter 7 estimated by the transmitter transfer function estimator 8 is represented as eTX(s), the temporary transfer function of the optical receiver 9 estimated by the first receiver transfer function estimator 13 is represented as eRX1(s), and the true transfer function of the optical receiver 9 estimated by the second receiver transfer function estimator 14 is represented as eRX2(s). The frequency of the signal TL7b in the optical transmitter 7 is represented as $s_{TX}$, the frequency of the local oscillator LD 9b in the optical receiver 9 is represented as $s_{RX}$, and the frequency offset $s_{TX}-s_{RX}$ therebetween is represented as $\Delta s_0$.

Here, the series of known signals input from the known signal inserter 5 is represented by the frequency-domain signal G(s). When the known signal G(s) is input into the optical transmitter 7, the signal TL (frequency $s_{TX}$) is modulated by the known signal G(s), and is output as a modulated signal $G(s+s_{TX})$ from the optical transmitter 7. When the modulated signal $G(s+s_{TX})$ is input into the optical receiver 9 and demodulated, a demodulated signal $G(s+s_{TX}-s_{RX})$ is output. In a case where the frequency offset $s_{TX}-s_{RX}=\Delta s_0$ is present, the demodulated signal $G(s+s_{TX}-s_{RX})$ is represented as $G(s+\Delta s_0)$. The transfer function of the optical transmitter 7 is represented by $TX(s+s_{TX})$. Note that the transmission characteristics on the transmission path 2 are compensated by the transmitter transfer function estimator 8 and the second receiver transfer function estimator 14. Accordingly, the characteristics are omitted from the following operation description.

The output signal of the optical transmitter 7 when the known signal G(s) is input into the transmitter compensator 6 is represented by $G(s+s_{TX}) \cdot TX(s+s_{TX})$. The transmitter compensator 6 is bypassed, and the known signal is affected by the transfer function of the optical transmitter 7. The output signal of the optical transmitter 7 is input into the optical receiver 9 through the transmission path 2. The output signal of the optical receiver 9 is represented by the following mathematical expression. At this time, the output signal of the optical transmitter 7 is affected by the frequency offset $\Delta s_0$ between transmission and reception, and the transfer function RX(s) of the optical receiver 9.

$$G(s+s_{TX}-s_{RX}) \cdot TX(s+s_{TX}-s_{RX}) \cdot RX(s) = G(s+\Delta s_0) \cdot TX(s+\Delta s_0) \cdot RX(s)$$

The output signal of the optical receiver 9 is input into the transmitter transfer function estimator 8 through the data buffer 10. The transmitter transfer function estimator 8 extracts the known signal G(s) from the output signal of the optical receiver 9, and performs the various transmission characteristics compensation. At this time, the frequency offset $\Delta s_0$ is detected, this offset is used to perform frequency offset compensation (s→s−$\Delta s_0$). The signal having been subjected to the frequency offset compensation is represented by $G(s) \cdot TX(s) \cdot RX(s-\Delta s_0)$.

Next, from the known signal having been subjected to the frequency offset compensation, the transfer function of the optical transmitter 7 is estimated. Specifically, the adaptive filter is applied, and the inverse function of the transfer function of the optical transmitter 7 is directly obtained as the time response. This method is equivalent to the following method. That is, the signal having been subjected to the frequency offset compensation is divided by the known signal G(s), which is a reference signal, and compensation of the optical receiver 9 is performed for the division result, thereby allowing the transfer function of the optical transmitter 7 to be estimated. The known signal as the reference signal indicates the known signal before transmission. Calculation of the reciprocal thereof allows the inverse transfer function of the optical transmitter 7 to be obtained. Note that the compensation of the optical receiver 9 is performed using the temporary transfer function RX_ASE(s−$\Delta s_0$) of the optical receiver 9 having been subjected to the frequency offset compensation in advance. Accordingly, the estimate value of the transfer function of the optical transmitter 7 is as follows.

$$eTX(s) = G(s) \cdot TX(s) \cdot RX(s - \Delta s_0) / G(s) / RX\_ASE(s - \Delta s_0)$$
$$= G(s) \cdot TX(s) \cdot |RX(s - \Delta s_0)| \cdot e^{[j\phi_{RX}(s - \Delta s_0)]} / G(s) / |RX(s - \Delta s_0)|$$
$$= TX(s) \cdot e^{[j\phi_{RX}(s - \Delta s_0)]}$$

The estimate value of the inverse transfer function of the optical transmitter 7 is $eTX(s)^{\wedge}(-1) = \{TX(s) \cdot e^{[j\phi_{RX}(s-\Delta s_0)]}\}^{\wedge}(-1)$. The estimated transfer function and inverse transfer function of the optical transmitter 7 includes the phase characteristics $\phi_{RX}(s-\Delta s_0)$ of the transfer function of the optical receiver 9.

Next, by changing the wavelength of the tunable laser 7b in the optical transmitter 7, the frequency is changed to $s_{TX1}$. The frequency offset between transmission and reception at this time is defined as $s_{TX1} - s_{RX} = \Delta s_1$. When steps S202 to S204 are executed in this state, the inverse transfer function of the optical transmitter 7 with the frequency offset $\Delta s_1$ is obtained as the following mathematical expression.

$$\{TX(s) \cdot e^{[j\phi_{RX}(s-\Delta s_1)]}\}^{\wedge}(-1)$$

Furthermore, the wavelength of the tunable laser 7b in the optical transmitter 7 is changed, and the transfer functions of the optical transmitter 7 for the frequency offsets $\Delta s_2$ to $\Delta s_{M-1}$ are obtained as follows.

$$\{TX(s) \cdot e^{[j\phi_{RX}(s-\Delta s_2)]}\}^{\wedge}(-1)$$
$$\ldots$$
$$\{TX(s) \cdot e^{[j\phi_{RX}(s-\Delta s_{M-1})]}\}^{\wedge}(-1)$$

The averaging of the inverse transfer functions of the optical transmitter 7 for M frequency offsets $\Delta s_1$ to $\Delta s_{M-1}$ is represented by the following mathematical expression.

$$(1/M)\{\{TX(s) \cdot e^{[j\phi_{RX}(s-\Delta s_0)]}\}^{\wedge}(-1) \ldots + \{TX(s) \cdot e^{[j\phi_{RX}(s-\Delta s_{M-1})]}\}^{\wedge}(-1) = TX(s)^{\wedge}(-1)(1/M)\{e^{[j\phi_{RX}(s-\Delta s_0)]}\}^{\wedge}(-1) \ldots + \{e^{[j\phi_{RX}(s-\Delta s_{M-1})]}\}^{\wedge}(-1)\}$$

$(1/M)\{e^{[j\phi_{RX}(s-\Delta s_0)]}\}^{\wedge}(-1) \ldots + \{e^{[j\phi_{RX}(s-\Delta s_{M-1})]}\}^{\wedge}(-1)$ in the above mathematical expression is the average value of the phase components of the inverse transfer functions of the optical receiver 9 for the multiple frequency offsets, and is defined as $e^{[j\phi_{RXAVE}(s)]\wedge(-1)}$.

$\phi_{RXAVE}(s)$ is a function indicating the phase characteristics obtained by averaging the phase components $\{e^{[j\phi_{RX}(s)]}\}^{\wedge}(-1)$ of multiple inverse transfer functions. In a strict sense, this is different from the function indicating the phase characteristics obtained by averaging the phase components $e^{[j\phi_{RX}(s)]}$ of multiple transfer functions. However, as described later, even a method of obtaining the inverse transfer function by averaging multiple transfer functions instead of multiple inverse transfer functions with respect to the phase component can exert similar advantageous effects, and is also within a scope of the technical spirit of the present disclosure. In a strict sense, exponential representation of the average of phase characteristics $\phi_{RX}(s)$ is different from the average of phase components $\{e^{[j\phi_{RX}(s)]}\}^{\wedge}(-1)$ of multiple inverse transfer functions or phase components $e^{[j\phi_{RX}(s)]}$ of multiple transfer functions, but can exert similar advantageous effects, and falls within the scope of the technical spirit of the present disclosure as well.

The average value of the inverse transfer functions of the optical transmitter 7, which are the output of the transmitter transfer function estimator 8, is represented by the following mathematical expression.

$$TX(s)^{\wedge}(-1) \cdot \{e^{[j\phi_{RXAVE}(s)]}\}^{\wedge}(-1) = \{TX(s) \cdot e^{[j\phi_{RXAVE}(s)]}\}^{\wedge}(-1)$$

In the transmitter transfer function estimator 8 shown in FIG. 5, the filter coefficient of the FIR filter constituting the adaptive filter is obtained as the time response of the inverse transfer function. Consequently, also by averaging this, the average value of the inverse transfer functions of the optical transmitter 7 can be obtained as the time response. This is obvious because the averaging of the time response and the averaging the frequency response have the relationship of Fourier transform or inverse Fourier transform.

As described above, in step S2, the transfer functions or the inverse transfer functions of the optical transmitter 7 estimated for multiple frequency offsets are averaged. The estimated transfer function of the optical transmitter 7 includes the actual transfer function TX(s) of the optical transmitter 7. Note that in the above case, the transfer function TX(s) stays unchanged with respect to multiple frequency offsets (the same even after being averaged). Accordingly, averaging of the phase components of the transfer functions of the optical receiver 9 can be selectively performed. The same applies also to the inverse transfer function or the phase characteristics.

In step S3 of obtaining the true transfer function of the optical receiver 9, the average inverse transfer function of the optical transmitter 7 estimated in step S2 is set in the transmitter compensator 6, and the second known signal $G2(s)$ is input into the transmitter compensator 6. The second known signal $G2(s)$ may be the same as or different from the known signal used in step S2. Here, the signal is discriminated as $G2(s)$, for convenience sake. The output signal of the optical transmitter 7 when the known signal $G2(s)$ is input into the transmitter compensator 6 is represented by the following mathematical expression.

$$G2(s+s_{TX}) \cdot [eTX(s+s_{TX})]^{\wedge}(-1) \cdot TX(s+s_{TX}) =$$
$$G2(s+s_{TX}) \cdot \{TX(s+s_{TX}) \cdot e^{\wedge}[j\phi_{RXAVE}(s+s_{TX})]\}^{\wedge}(-1) \cdot TX(s+s_{TX}) =$$
$$G2(s+s_{TX}) \cdot \{e^{\wedge}[j\phi_{RXAVE}(s+s_{TX})]\}^{\wedge}(-1)$$

The aforementioned output signal of the optical transmitter 7 is input into the optical receiver 9 through the transmission path 2. At this time, with the frequency offset $(s_{TX}-s_{RX}=\Delta s_0)$ between transmission and reception, the output signal of the optical receiver 9 is represented by the following mathematical expression.

$$G2(s+s_{TX}-s_{RX}) \cdot \{e^{\wedge}[j\phi_{RXAVE}(s+s_{TX}-s_{RX})]\}^{\wedge}(-1) \cdot RX(s) = G2(s+\Delta s_0) \cdot \{e^{\wedge}[j\phi_{RXAVE}(s+\Delta s_0)]\}^{\wedge}(-1) \cdot |RX(s)| \cdot e^{\wedge}[j\phi_{RX}(s)]$$

The output signal of the optical receiver 9 is input into the second receiver transfer function estimator 14 through the data buffer 10. The second receiver transfer function estimator 14 extracts the second known signal $G2(s)$ from the output signal of the optical receiver 9, and inputs the signal into the adaptive filter. Various transmission characteristics estimated as the transmission path distortions are added also to the second known signal $G2(s)$. It is herein assumed that compensation is made except the frequency offset, and the description is omitted.

At this time, the frequency offset $\Delta s_0$ is detected, and the frequency offset $\Delta s_0$ is in advance added to the second known signal $G2(s)$, ($s \rightarrow s+\Delta s_0$). The second known signal to which the frequency offset $\Delta s_0$ has been added is represented by $G2(s+\Delta s_0)$.

Next, the adaptive filter is applied, and the inverse function of the true transfer function of the optical receiver 9 is directly obtained. This method is equivalent to division of the second known signal extracted from the output signal of the optical receiver 9 by the second known signal as the reference signal to which the frequency offset is added. The second known signal as the reference signal indicates the second known signal before transmission. Consequently, the true transfer function of the optical receiver 9 is represented by the following mathematical expression.

$$G2(s+s_0) \cdot \{e^{\wedge}[j\phi_{RXAVE}(s+\Delta s_0)]\}^{\wedge}(-1) \cdot |RX(s)| \cdot e^{\wedge}[j\phi_{RX}(s)]/G2$$
$$(s+\Delta s_0) = \{e^{\wedge}[j\phi_{RXAVE}(s+\Delta s_0)]\}^{\wedge}(-1) \cdot |RX(s)| \cdot e^{\wedge}[j\phi_{RX}(s)] =$$
$$|RX(s)| \cdot e^{\wedge}j[\phi_{RX}(s) - \phi_{RXAVE}(s+\Delta s_0)]$$

The true inverse transfer function of the optical receiver 9 is obtained as the reciprocal of the transfer function. Accordingly, the following holds. $\{|RX(s)| \cdot e^{\wedge}j[\phi_{RX}(s)-\phi_{RXAVE}(s+\Delta s_0)]\}^{\wedge}(-1)$.

As a result of the calibration described above, the inverse transfer function of the optical transmitter 7 $\{TX(s) \cdot e^{\wedge}[j\phi_{RXAVE}(s)]\}^{\wedge}(-1)$, and the true inverse transfer function of the optical receiver 9 $\{|RX(s)| \cdot e^{\wedge}j[\phi_{RX}(s)-\phi_{RXAVE}(s+\Delta s_0)]\}^{\wedge}(-1)$ are obtained. These are set in the transmitter compensator 6 and the receiver compensator 11 when optical communication is in service.

Subsequently, the operation of optical communication in service is described. During execution of the calibration described above, it is assumed that the frequency of the tunable laser 7b of the optical transmitter 7 is six, the frequency of the laser module 9b of the optical receiver 9 is $s_{RX}$, and frequency offset between transmission and reception is $s_{TX}-s_{RX}=\Delta s_0$. On the other hand, during service of optical communication, a case is assumed where the frequency of the tunable laser 7b of the optical transmitter 7 is changed to $s_{TXa}$. Note that it is assumed that the frequency of the laser module 9b of the optical receiver 9 stays to be $s_{RX}$. The frequency offset at this time is defined as $s_{TXa}-s_{RX}=\Delta s_a$.

During service of optical communication, the output signal of the optical transmitter 7 in a case where a signal $A(s)$ is input on the transmission side is represented by the following mathematical expression, with the frequency change ($s \rightarrow s_{TXa}$) of the tunable laser 7b.

$$A(s+s_{TXa}) \cdot \{TX(s+s_{TXa}) \cdot e^{\wedge}[j\phi_{RXAVE}(s+s_{TXa})]\}^{\wedge}(-1) \cdot TX$$
$$(s+s_{TXa}) = A(s+s_{TXa}) \cdot \{e^{\wedge}[j\phi_{RXAVE}(s+s_{TXa})]\}^{\wedge}(-1)$$

The aforementioned output signal of the optical transmitter 7 is input into the optical receiver 9 through the transmission path 2. At this time, with the frequency offset $s_{TXa}-s_{RX}=\Delta s_a$ between transmission and reception, the output signal of the optical receiver 9 is represented by the following mathematical expression.

$$A(s+s_{TXa}-s_{RX}) \cdot \{e^{\wedge}[j\phi_{RXAVE}(s+s_{TXa}-s_{RX})]\}^{\wedge}(-1) \cdot RX(s) =$$
$$A(s+\Delta s_a) \cdot \{e^{\wedge}[j\phi_{RXAVE}(s+\Delta s_a)]\}^{\wedge}(-1) \cdot |RX(s)| \cdot e^{\wedge}[j\phi_{RX}(s)] =$$
$$A(s+\Delta s_a) \cdot |RX(s)| \cdot e^{\wedge}[j\phi_{RX}(s)] \cdot \{e^{\wedge}[j\phi_{RXAVE}(s+\Delta s_a)]\}^{\wedge}(-1)$$

The signal after the frequency offset compensation ($s \rightarrow s-\Delta s_a$) is represented as the following mathematical expression.

$$A(s) \cdot |RX(s-\Delta s_a)| \cdot e^{\wedge}[j\phi_{RX}(s-\Delta s_a)] \cdot \{e^{\wedge}[j\phi_{RXAVE}(s)]\}^{\wedge}(-1) = A(s) \cdot |RX(s-\Delta s_a)| \cdot e^{\wedge}j[\phi_{RX}(s-\Delta s_a)-\phi_{RXAVE}(s)]$$

Alternatively, the frequency offset compensation can be executed on the following stage of the receiver compensator 11.

Next, if in the receiver compensator 11, the compensation is made with the true transfer function of the optical receiver 9, the output of the receiver compensator 11 is represented by the following mathematical expression. Note that the transfer function to be compensated is subjected to the frequency offset compensation in advance, with the detected frequency offset $\Delta s_a(s \rightarrow s-\Delta s_a)$.

$$A(s) \cdot |RX(s-\Delta s_a)| \cdot e^{\wedge}j[\phi_{RX}(s-\Delta s_a)-\phi_{RXAVE}(S)] \cdot \{|RX(s-\Delta s_a)| \cdot e^{\wedge}j[\phi_{RX}(s-\Delta S_a)-\phi_{RXAVE}(S-\Delta s_a+\Delta s_0)]\}^{\wedge}(-1) = A(s) \cdot e^{\wedge}j[\phi_{RXAVE}(s-(\Delta s_a-\Delta s_0))-\phi_{RXAVE}(s)]$$

In the above result, $\phi_{RXAVE}(s)$ is equivalent to the phase characteristics obtained by the transmitter transfer function estimator 8 obtaining the inverse transfer functions for multiple frequency offsets, averaging the functions, and calculating therefrom. Here, if the variation of $\phi_{RXAVE}(s)$ to s is small, it is assumed as $\phi_{RXAVE}(s-(\Delta s_a-\Delta s_0)) \approx \phi_{RXAVE}(s)$ even with the frequency offset having variation $(\Delta s_a-\Delta s_0)$. In this case, the output of the receiver compensator 11 is $A(s) \cdot e^{\hat{}} j[\phi_{RXAVE}(s-(\Delta s_a-\Delta s_0))-\phi_{RXAVE}(s)] \approx A(s)$, thus allowing the signal $A(s)$ to be reproduced irrespective of variation in frequency offset. That is, even if the frequency offset amount $\Delta s$ varies between calibration and service of optical communication, satisfactory transmitter compensation and receiver compensation can be performed, and the signal $A(s)$ can be satisfactorily reproduced.

Subsequently, the advantageous effects of this embodiment are described in comparison with a comparative example. For the signal TL of the optical transmitter 7, the comparative example does not use the tunable laser 7b but uses a laser diode incapable of changing the frequency. The transmitter transfer function estimator 8 calculates the transfer function or the inverse transfer function of the optical transmitter 7 for only one frequency offset, and sets the function in the transmitter compensator 6. Also in the comparative example, the compensation operation in the case where the frequency offset $\Delta s_0$ between transmission and reception is present can be performed.

However, it has been known that the tunable laser 7b of the optical transmitter 7 or the laser module 9b of the optical receiver 9 varies in frequency over time owing to change in environment, such as temperature, or time-dependent deterioration. Furthermore, also by the fluctuation of laser frequency, variation on the order of the several hundreds of megahertz sometimes occur in the frequency offset. A result of detailed analysis shows that a problem occurs when the frequency offset varies between calibration with the estimated transfer function and service of optical communication.

The mechanism of generating the problem is described. Here, the frequency of the tunable laser 7b of the optical transmitter 7 is represented as $s_{TX}$, the frequency of the laser module 9b of the optical receiver 9 is represented as $s_{RX}$, and the frequency offset $s_{TX}-s_{RX}$ therebetween are represented as $\Delta s_0$. A case is considered where the frequency of the tunable laser 7b of the optical transmitter 7 possibly varies to $s_{TXa}$ during service of optical communication, and the frequency of the laser module 9b of the optical receiver 9 stays unchanged at $s_{RX}$. The frequency offset at this time is defined as $s_{TXa}-s_{RX}=\Delta s_a$.

Here, if the phase component of the transfer function of the optical receiver 9 included in the estimate value of the transfer function of the optical transmitter 7 is equal to the phase characteristics of the transfer function of the optical receiver 9 when the true transfer function of the optical receiver 9 is obtained, the true transfer function of the optical receiver 9 is $|RX(s)|$. This is equal to the temporary transfer function of the optical receiver 9 obtained in step 1. Note that it is required that the number of taps of the filter for compensation is the same between the transmitter compensator 6 and the receiver compensator 11, or the inverse transfer function can be accurately represented therebetween. If the number of taps of the filter for compensation of the transmitter compensator 6 is small, and the resolution of representing the phase characteristics of the inverse transfer function is low (the number of taps of the filter for compensation is sometimes different between transmission and reception), a component where the transmission characteristics of the optical transmitter 7 cannot be completely compensated sometimes remains in the compensation operation of the transmitter compensator 6 described above. It should be noted that in this case, the remaining part of the transmission characteristics of the optical transmitter 7 is included in the aforementioned true transfer function of the optical receiver 9.

During calibration, the estimate value of the transfer function of the optical transmitter 7 is $TX(s) \cdot e^{\hat{}}[j\phi_{RX}(s-\Delta s_0)]$, and the estimate value of the true transfer function of the optical receiver 9 is $|RX(s)|$. During service of optical communication, the inverse function of $TX(s) \cdot e^{\hat{}}[j\phi_{RX}(s-\Delta s_0)]$ is set in the transmitter compensator 6, and the inverse function of $|RX(s)|$ is set in the receiver compensator 11.

During service of optical communication, the output signal of the optical transmitter 7 in a case where a signal $A(s)$ is input on the transmission side is represented by the following mathematical expression, with the frequency change of the signal TL ($s \rightarrow s_{TXa}$).

$$A(s+s_{TXa}) \cdot \{TX(s+s_{TXa}) \cdot E^{\hat{}}[j\phi_{RX}(s+s_{TXa}-\Delta s_0)]\}^{\hat{}}(-1)$$
$$\cdot TX(s+s_{TXa})=A(s+s_{TXa}) \cdot \{e^{\hat{}}[j\phi_{RX}(S+S_{TXa}-\Delta S_0)]\}^{\hat{}}(-1)$$

The aforementioned output signal of the optical transmitter 7 is input into the optical receiver 9 through the transmission path 2. At this time, the output signal of the optical receiver 9 is represented by the following mathematical expression in consideration of the frequency offset $s_{TXa}-s_{RX}=\Delta s_a$ between transmission and reception.

$$A(s+s_{TXa}-s_{RX}) \cdot \{e^{\hat{}}[j\phi_{RX}(s+s_{TXa}-s_{RX}-\Delta s_0)]\}^{\hat{}}(-1) \cdot RX(s) =$$
$$A(s+\Delta s_a) \cdot \{e^{\hat{}}[j\phi_{RX}(s+\Delta s_a-\Delta s_0)]\}^{\hat{}}(-1) \cdot |RX(s)| \cdot e^{\hat{}}[j\phi_{RX}(s)] =$$
$$A(s+\Delta s_a) \cdot |RX(s)| \cdot e^{\hat{}}[j\phi_{RX}(s)] \cdot \{e^{\hat{}}[j\phi_{RX}(s+\Delta s_a-\Delta s_0)]\}^{\hat{}}(-1)$$

The signal after the frequency offset compensation ($s \rightarrow s-\Delta s_a$) is represented as the following mathematical expression.

$$A(s) \cdot |RX(s-\Delta s_a)| \cdot e^{\hat{}}[j\phi_{RX}(s-\Delta s_a)] \cdot \{e^{\hat{}}[j\phi_{RX}(s-\Delta s_0)]\}^{\hat{}}$$
$$(-1)=A(s) \cdot |RX(s-\Delta s_a)| \cdot e^{\hat{}} j[\phi_{RX}(s-\Delta s_a)-\phi_{RX}(s-\Delta s_0)]$$

Alternatively, the frequency offset compensation can be executed on the following stage of the receiver compensator 11.

Next, in the receiver compensator 11, compensation is performed with the true transfer function $|RX(s)|$ of the optical receiver 9 (division by $|RX(s)|$). The output of the receiver compensator 11 is represented by the following mathematical expression. Note that the transfer function to be compensated is subjected to the frequency offset compensation in advance, with the detected frequency offset $\Delta s_a$ ($s \rightarrow s-\Delta s_a$).

$$A(s) \cdot |RX(s-\Delta s_a)| \cdot e^{\hat{}}\{j[\phi_{RX}(s-\Delta S_a)-\phi_{RX}(S-\Delta S_0)]\} \cdot |RX(S-\Delta s_a)|^{\hat{}}(-1)=A(s) \cdot e^{\hat{}}\{j[\phi_{RX}(s-\Delta s_a)-\phi_{RX}(s-\Delta s_0)]\}$$

As the result described above, if the frequency offset $\Delta s_0$ during estimation of the transfer function and the frequency offset $\Delta s_a$ during service of optical communication are different, the input signal $A(s)$ is sometimes affected by the phase characteristics of the transfer function of the optical receiver 9, at the output of the receiver compensator 11.

FIG. 9 is a diagram for illustrating the effects of the phase characteristics of the transfer function of the optical receiver. The ordinate axis is the phase characteristics $\phi_{RX}$, and the abscissa axis is the variable s indicating the frequency. $\phi_{RX}(s-\Delta s_0)$ has characteristics where the phase characteristics $\phi_{RX}(s)$ of the transfer function of the actual optical receiver are shifted in the s-axis direction by $\Delta s_0$. $\phi_{RX}(s-\Delta s_a)$ has characteristics where the phase characteristics $\phi_{RX}(s)$ are shifted by $\Delta s_a$. At any frequency $s_t$, the value of $\phi_{RX}(s-\Delta s_0)$ is different from the value of $\phi_{RX}(s-\Delta s_a)$. Accordingly, $[\phi_{RX}(s-\Delta s_a)-\phi_{RX}(s-\Delta s_0)]$ is not zero, and reproduction of the signal $A(s)$ is affected. Note that in a case of $\Delta s_a=\Delta s_0$, $[\phi_{RX}(s-\Delta s_a)-\phi_{RX}(s-\Delta s_0)]$ is zero, which does not affect the reproduction of the signal $A(s)$. Consequently, if the frequency offset $\Delta s_0$ during estimation of the transfer function is different from the frequency offset $\Delta s_a$ during service of optical communication, the larger the difference $[\phi_{RX}(s-\Delta s_a)-\phi_{RX}(s-\Delta s_0)]$ is, more largely the reproduction signal $A(s)$ is affected.

Typically, it is conceivable that $e^{\hat{}}\{j[\phi_{RX}(s-\Delta s_a)-\phi_{RX}(s-\Delta s_0)]\}$ part can be compensated by the adaptive equalization filter on the following stage of the receiver compensator 11. However, in actuality, the number of taps of the adaptive equalization filter is often limited in view of power, and compensation by the adaptive equalization filter cannot sufficiently be performed. In the receiver compensator 11, since a large number of taps can be set for compensating static characteristics, the compensation by the receiver compensator 11 is desirable.

Figure 10:
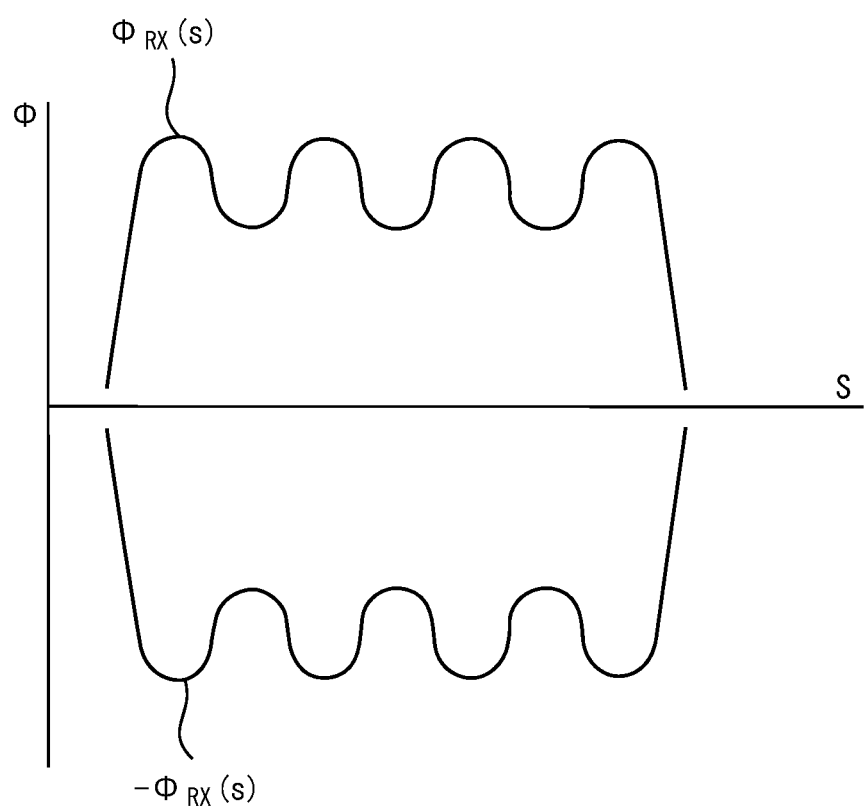
FIG. 10 shows the typical phase characteristics of the transfer function and the inverse transfer function of the optical receiver.

FIG. 10 shows the typical phase characteristics of the transfer function and the inverse transfer function of the optical receiver. The upper side of the diagram indicates the phase characteristics $\phi_{RX}(s)$ of the transfer function, and the lower side indicates the phase characteristics $-\phi_{RX}(s)$ of the inverse transfer function. High-frequency wiring is used for signal paths of the optical transmitter 7 and the optical receiver 9. In the high-frequency wiring, periodic ripples occur in the transmission characteristics in the frequency direction owing to reflection of high-frequency signal. Also in the phase characteristics of the transfer function and the inverse transfer function of the optical receiver 9, periodic ripples occur. That is, the phase characteristics periodically vary in the frequency direction. The variation period depends on the frequency of the optical signal, the length of the high-frequency wiring and the like. Consequently, in the comparative example, when a frequency offset during service of optical communication different from that during calibration occurs, the phase component $e^{\hat{}}\{j[\phi_{RX}(s-\Delta s_a)-\phi_{RX}(s-\Delta s_0)]\}$ in the output of the receiver compensator 11 $A(s)\cdot e^{\hat{}}\{j[\phi_{RX}(s-\Delta s_a)-\phi_{RX}(s-\Delta s_0)]\}$ is not zero, thus affecting reproduction of the signal $A(s)$.

Figure 11:
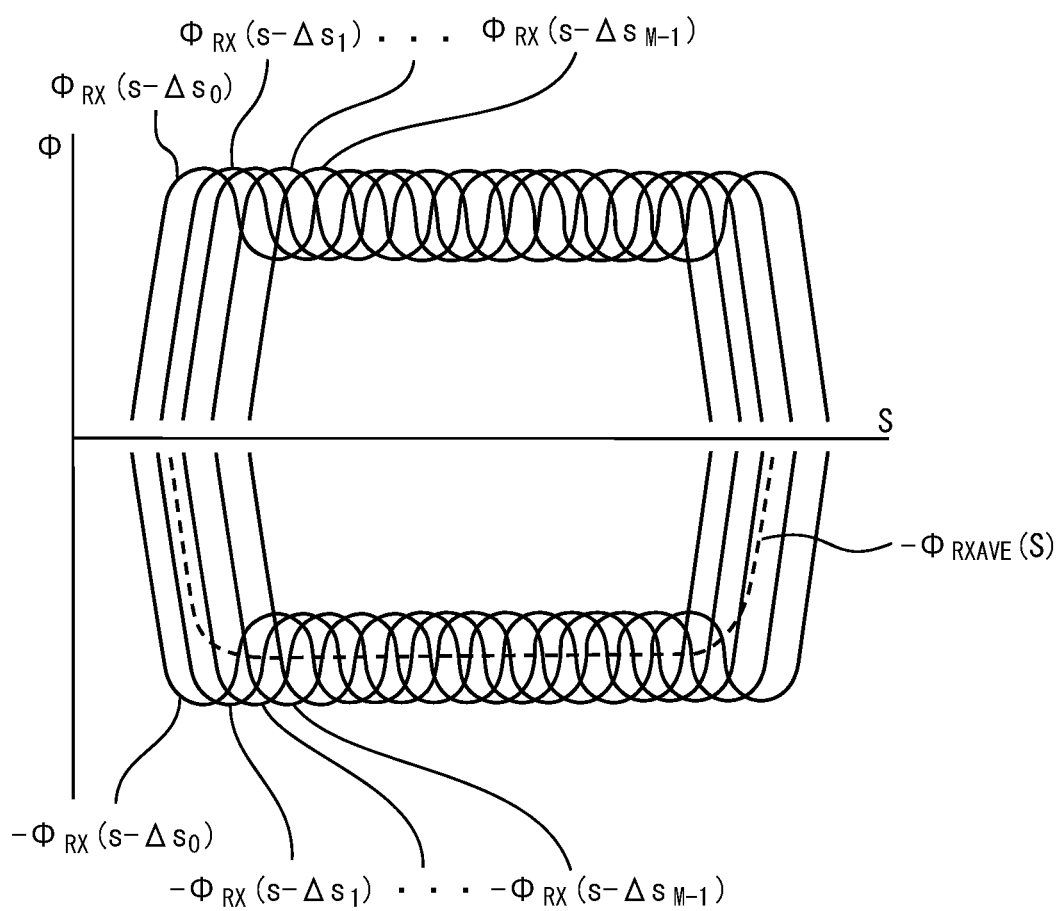
FIG. 11 is a diagram for illustrating the averaging of the inverse transfer functions of the optical transmitter estimated for multiple frequency offsets.

FIG. 11 is a diagram for illustrating the averaging of the inverse transfer functions of the optical transmitter estimated for multiple frequency offsets. In this embodiment, the inverse transfer functions of the optical transmitter 7 estimated for multiple frequency offsets are averaged. When the frequency offset occurs, the phase characteristics of the transfer function of the optical receiver 9 are shifted in the frequency direction (s direction) by the frequency offset. For example, when the frequency offset is $\Delta s_1$, the phase characteristics are $\phi_{RX}(s-\Delta s_1)$. Likewise, when the frequency offset is $\Delta s_{M-1}$, the phase characteristics are $\phi_{RX}(s-\Delta s_{M-1})$. The same applies also to the phase characteristics of the inverse transfer functions. With M-time repetition of steps S201 to S205 the inverse transfer functions for M frequency offsets are obtained. In step S206, these M inverse transfer functions are averaged. In FIG. 11, the phase characteristics obtained from the averaged inverse transfer functions are represented by $-\phi_{RXAVE}(s)$.

As shown in the diagram, the multiple frequency offsets are set in a manner narrowly divided over the ripple period. Specifically, the multiple frequency offsets are set so as to divide, into two or more, the variation period of the phase characteristics of the transfer function or the inverse transfer function of the optical transmitter 7 estimated to the initial frequency offset. Accordingly, $-\phi_{RXAVE}(s)$ have approximately flat characteristics. For example, in a case where the ripple period is 5 GHz, the frequency offset may be selected about every 1 GHz. Specifically, for those obtained by adding four frequency offset amounts of 1, 2, 3 and 4 GHz to the frequency offset $\Delta s_0$ during calibration, the respective inverse transfer functions are obtained and averaged. At this time, high accuracy is not required. It is only required that the periodic phase characteristics have relatively gradual characteristics by averaging. A certain extent of variation of frequency offset amounts to be set is allowed.

As described above, if the variation of $\phi_{RXAVE}(s)$ with respect to s is small, it is assumed as $\phi_{RXAVE}(s-(\Delta s_a-\Delta s_0))\approx\phi_{RXAVE}(s)$ even with the frequency offset having variation $(\Delta s_a-\Delta s_o)$. In this case, the output of the receiver compensator 11 is $A(s)\cdot e^{\hat{}}j[\phi_{RXAVE}(s-(\Delta s_a-\Delta s_0))-\phi_{RXAVE}(s)]\approx A(s)$, thus allowing the signal $A(s)$ to be reproduced irrespective of variation in frequency offset. That is, even if the frequency offset amount $\Delta s$ varies between calibration and service of optical communication, satisfactory transmitter compensation and receiver compensation can be performed, and the signal $A(s)$ can be satisfactorily reproduced. Note that similar advantageous effects can be obtained even in a case where the frequency change itself occurs. Accordingly, Q-value deterioration due to the time-dependent deterioration of the laser for local oscillation or the fluctuation of laser frequency (long term and short term) can also be suppressed. $[\phi_{RXAVE}(s-(\Delta s_a-\Delta s_0))-\phi_{RXAVE}(s)]$ is not required to be completely zero. If the value is smaller than that before application of the present this disclosure, is also the advantageous effects of the present disclosure.

The description has been made in the case where the phase characteristics relatively periodically vary. There is no limitation thereto. There can be a case of smoothing by the averaging range and the change width of the frequency offset, if not periodic. Also in such a case, the advantageous effects of the present disclosure can be obtained. Accordingly, this case is encompassed by the scope of the technical spirit of the present disclosure.

As described above, in this embodiment, the process of estimating the transfer function or the inverse transfer function of the optical transmitter 7 is executed for multiple frequency offsets, the transfer functions or the inverse transfer functions of the optical transmitter 7 estimated for the multiple frequency offsets, or the phase characteristics thereof are averaged, and the average transfer function or the average inverse transfer function of the optical transmitter 7 is obtained. At this time, averaging is performed so as to reduce rapid variation in phase to the frequency. Accordingly, even if the frequency offset varies between calibration and service owing to time-dependent deterioration or the fluctuation of laser frequency, the transmission characteristics can be satisfactorily estimated or compensated.

Note that in this embodiment, the signal TL of the optical transmitter 7 is the tunable laser 7b. Alternatively, the laser module 9b of the optical receiver 9 may be a tunable laser. Only if the carrier frequency of at least one of the optical transmitter 7 and the optical receiver 9 is variable and multiple frequency offsets between transmission and reception can be set, means is not specifically limited. The tunable laser is generally widespread. By setting data corresponding to the wavelength from the outside, the wavelength, i.e., frequency, can be easily changed. The tunable laser 7b used for an optical transmission system has a function of switching the center frequency to multiple transmission channels by a step of, for example, about 100 GHz, and a function of adjusting the frequency of the center channel by about megahertz units. A frequency measuring instrument may be added to the tunable laser 7*b*.

The averaging described above indicates averaging of the inverse transfer functions for the multiple frequency offsets. However, as described above, averaging of the tap coefficients of the FIR filter indicating the time response of the inverse transfer function may be adopted. Furthermore, there is a case where a difference occurs to a certain extent through calculation. Also by obtaining the inverse transfer function after averaging the transfer functions, the variation in phase characteristics can be reduced, and the advantageous effects of the present disclosure can be obtained. Further alternatively, also by averaging the phase characteristics themselves of the transfer functions and the inverse transfer functions, the variation in phase characteristics can be reduced. Accordingly, the advantageous effects of the present disclosure can be obtained.

Here, the difference between phase characteristics averaging, transfer function (phase component) averaging, and inverse transfer function (phase component) averaging is described. Provided that three phase characteristics are a(s), b(s) and c(s), the phase components of these transfer functions are $e^{ja(s)}$, $e^{jb(s)}$ and $e^{jc(s)}$, respectively, and the phase components of the inverse transfer functions are $e^{-ja(s)}$, $e^{-jb(s)}$ and $e^{-jc(s)}$, respectively. The phase characteristics averaging is calculated by $[a(s)+b(s)+c(s)]/3$ using the sum of phases. The transfer function averaging is calculated by $[e^{ja(s)}+e^{jb(s)}+e^{jc(s)}]/3$ using vector synthesis. The inverse transfer function averaging is calculated by $[e^{-ja(s)}+e^{-jb(s)}+e^{-jc(s)}]/3$ using vector synthesis. These are different from each other. The inverse transfer function obtained by phase characteristics averaging, the inverse transfer function obtained by transfer function averaging, and averaging of the inverse transfer functions have relatively identical values in some cases. Through any of these calculations, the average transfer function or the average inverse transfer function of the optical transmitter 7 is obtained.

According to the description so far, the temporary transfer function of the optical receiver 9 is $|RX(s)|$ obtained by inputting the ASE signal from the input end of the optical receiver 9. However, without limitation thereto, for example, the temporary transfer function of the optical receiver 9 can be $RX(s)=1$. This is applicable also to a case of omitting the step of estimating the temporary transfer function. Also in this case, the estimated transfer function of the optical transmitter 7 includes the transmission characteristics of the optical receiver 9 (both the amplitude component and the phase component). Accordingly, degradation of compensation is caused by variation in frequency offset. Also in such a case, by averaging the estimation values of the transfer functions of the optical transmitter 7 for the multiple frequency offsets, the advantageous effects of the present disclosure can be obtained. Accordingly, this case is encompassed by the scope of the technical spirit of the present disclosure.

The method of obtaining the transfer function or the inverse transfer function in the transmitter transfer function estimator 8, the first receiver transfer function estimator 13, and the second receiver transfer function estimator 14, and the method of compensation in the transmitter compensator 6 and the receiver compensator 11 are not limited to adaptive equalization, and may be a method of calculation in the frequency domain as indicated by the embodiment in FIGS. 6 and 8 in PTL 1.

In the transmitter transfer function estimator 8 shown in FIG. 5, the first known signal is extracted from the digital data obtained by the reception unit 3 when the first known signal is transmitted from the transmission unit 1 to the reception unit 3, the signal is compensated with the transmission path characteristics and the temporary transfer function of the optical receiver 9, is compared with the first known signal before transmission, and the transfer function or the inverse transfer function of the optical transmitter is estimated. However, the method of estimating the transfer function or the inverse transfer function of the optical transmitter 7 is not limited thereto. The extracted first known signal is affected by the transfer function of the optical transmitter 7, the transmission path characteristics, and the transfer function of the optical receiver 9. Accordingly, for example, also by comparing the extracted first known signal with the signal obtained by adding the transmission path characteristics and the temporary transfer function of the optical receiver 9 to the known signal before transmission, the transfer function or the inverse transfer function of the optical transmitter 7 can be estimated. Furthermore, the transfer function or the inverse transfer function of the optical transmitter 7 can be estimated also by comparing the signal obtained by compensating the extracted first known signal using the transmission path characteristics or the temporary transfer function of the optical receiver 9, with first known signal before transmission to which what is not compensated for the extracted first known signal between the transmission path characteristics and the temporary transfer function of the optical receiver 9 is added.

The modification of the estimation method described above also holds for the method of estimating in the second receiver transfer function estimator 14. In the second receiver transfer function estimator 14 shown in FIG. 7, the second known signal is extracted from the digital data obtained by the reception unit 3 when the second known signal is transmitted from the transmission unit 1 where the transmission characteristics of the optical transmitter 7 are compensated to the reception unit 3, using the average transfer function or the average inverse transfer function of the optical transmitter 7, and is compared with the signal obtained by adding the transmission path characteristics to the second known signal before transmission, and the true transfer function or inverse transfer function of the optical receiver 9 is estimated. However, the method of estimating the true transfer function or inverse transfer function of the optical receiver 9 is not limited thereto. For example, the true transfer function or inverse transfer function of the optical receiver 9 can be estimated also by comparing the signal obtained by compensating the extracted second known signal using the transmission path characteristics, with the second known signal before transmission. Furthermore, in a case where the second known signal is not compensated with the average transfer function or the average inverse transfer function of the optical transmitter 7 on the transmission side in advance, the true transfer function or inverse transfer function of the optical receiver 9 can be estimated also by comparing the signal obtained by compensating the second known signal extracted from the digital data obtained by the reception unit 3 about at least one or none of the average transfer function of the optical transmitter 7 and the transmission path characteristics, with the second known signal before transmission to which what is not compensated for the extracted second known signal between the average transfer function of the optical transmitter 7 and the transmission path characteristics is added.

REFERENCE SIGNS LIST

1 transmission unit; 2 transmission path; 3 reception unit; 6 transmitter compensator; 7 optical transmitter; 8 transmitter transfer function estimator; 9 optical receiver; 11 receiver compensator; 13 first receiver transfer function estimator; 14 second receiver transfer function estimator

The invention claimed is:

1. An optical transmission characteristics estimation method estimating transmission characteristics of an optical transmitter of a transmitter and an optical receiver of a receiver connected to each other via an optical transmission path by an optical transmission characteristics estimation system and wherein carrier frequency of at least one of the optical transmitter and the optical receiver is variable, comprising:
   performing estimating a transfer function or an inverse transfer function of the optical transmitter, from first data obtained by the optical receiver when a first known signal is transmitted from the transmitter to the receiver, and a temporary transfer function or a temporary inverse transfer function of the optical receiver, for multiple frequency offsets between the optical transmitter and the optical receiver; and
   obtaining an average transfer function or an average inverse transfer function of the optical transmitter by averaging the transfer functions or the inverse transfer functions of the optical transmitter estimated for the multiple frequency offsets, or averaging and exponentially representing phase characteristics $\Phi(s)$ of the transfer functions or the inverse transfer functions of the optical transmitter estimated for the multiple frequency offsets where s represents a variable indicating frequency, $|T(s)|$ represents an amplitude component of the transfer function of the optical transmitter, $\Phi(s)$ represents phase characteristics, and $|T(s)|\times\exp(j\Phi(s))$ represents the transfer function of the optical transmitter,
   wherein in the performing, the transfer function or the inverse transfer function of the optical transmitter is estimated by comparing the first data for which at least one or none of the temporary transfer function of the optical receiver and transmission path characteristics detected in the receiver is compensated, with a first known signal before transmission to which what is not compensated for the first data between the temporary transfer function of the optical receiver and the transmission path characteristic is added.

2. The optical transmission characteristics estimation method according to claim 1, further comprising estimating a transfer function or an inverse transfer function of the optical receiver from second data obtained by the optical receiver when a second known signal is transmitted from the transmitter to the receiver,
   wherein in the estimating the transfer function or the inverse transfer function, in a case where the second known signal is compensated with the average transfer function or the average inverse transfer function of the optical transmitter on a transmission side in advance, a transfer function or an inverse transfer function of the optical receiver is estimated by comparing the second data where the transmission path characteristics is compensated with a second known signal before transmission, or comparing the second data where the transmission path characteristics is not compensated with a second known signal before transmission to which the transmission path characteristics is added, and
   in a case where the second known signal is not compensated with the average transfer function or the average inverse transfer function of the optical transmitter on the transmission side in advance, a transfer function or an inverse transfer function of the optical receiver is estimated by comparing the second data where at least one or none of the average transfer function of the optical transmitter and the transmission path characteristics is compensated, with a second known signal before transmission to which what is not compensated for the second data between the average transfer function of the optical transmitter and the transmission path characteristics is added.

3. The optical transmission characteristics estimation method according to claim 1, wherein the multiple frequency offsets are set so as to divide, into two or more, a variation period in a frequency direction of phase characteristics of the transfer function or the inverse transfer function of the optical transmitter estimated to an initial frequency offset.

4. The optical transmission characteristics estimation method according to claim 1, wherein in the performing, the first data transmitted from the transmitter to the receiver, obtained by compensating transmission path characteristics and a transfer function of the optical receiver, and having a remaining effect of a transfer function of the optical transmitter is input into a digital filter, and the transfer function or the inverse transfer function of the optical transmitter is estimated as a filter coefficient of the digital filter in a case of convergence with an error with a first known signal before transmission, being minimized.

5. The optical transmission characteristics estimation method according to claim 2, wherein in the estimating the transfer function or the inverse transfer function, in a case where the second known signal is compensated with the average transfer function or the average inverse transfer function of the optical transmitter on a transmission side in advance, the second data is input into a digital filter and the transfer function or the inverse transfer function of the optical receiver is estimated as a filter coefficient of the digital filter in a case of convergence with an error between an output of the digital filter and a signal obtained by adding transmission path characteristics to the second known signal before transmission being minimized.

6. The optical transmission characteristics estimation method according to claim 1, further comprising estimating the temporary transfer function or the temporary inverse transfer function of the optical receiver only in the receiver before the performing.

7. The optical transmission characteristics estimation method according to claim 6, wherein in the estimating the temporary transfer function or the temporary inverse transfer function, the temporary transfer function or the temporary inverse transfer function of the optical receiver is estimated from third data output from the optical receiver when a test signal having a known spectrum is input into an input end of the optical receiver.

8. The optical transmission characteristics estimation method according to claim 1, wherein in the performing, the temporary transfer function of the optical receiver is set to 1 and estimating a transfer function or an inverse transfer function of the optical transmitter is performed.

9. An optical transmission characteristics estimation system comprising a transmitter transfer function estimator estimating transmission characteristics of an optical transmitter of a transmitter and an optical receiver of a receiver connected to each other via an optical transmission path,
   wherein carrier frequency of at least one of the optical transmitter and the optical receiver is variable,
   the transmitter transfer function estimator is configured to perform estimating a transfer function or an inverse transfer function of the optical transmitter, from first data obtained by the optical receiver when a first known signal is transmitted from the transmitter to the receiver, and a temporary transfer function or a temporary inverse transfer function of the optical receiver, for multiple frequency offsets between the optical transmitter and the optical receiver, and an average transfer function or an average inverse transfer function of the optical transmitter is obtained by averaging the transfer functions or the inverse transfer functions of the optical transmitter estimated for the multiple frequency offsets, or averaging and exponentially representing phase characteristics Φ(s) of the transfer functions or the inverse transfer functions of the optical transmitter estimated for the multiple frequency offsets where s represents a variable indicating frequency, |T(s)| represents an amplitude component of the transfer function of the optical transmitter, Φ(s) represents phase characteristics, and |T(s)|×exp(jΦ(s)) represents the transfer function of the optical transmitter, and the transfer function or the inverse transfer function of the optical transmitter is estimated by comparing the first data for which at least one or none of the temporary transfer function of the optical receiver and transmission path characteristics detected in the receiver is compensated, with a first known signal before transmission to which what is not compensated for the first data between the temporary transfer function of the optical receiver and the transmission path characteristic is added.

10. The optical transmission characteristics estimation system according to claim 9, further comprising a first receiver transfer function estimator estimating a transfer function or an inverse transfer function of the optical receiver from second data obtained by the optical receiver when a second known signal is transmitted from the transmitter to the receiver, wherein in a case where the second known signal is compensated with the average transfer function or the average inverse transfer function of the optical transmitter on a transmission side in advance, a transfer function or an inverse transfer function of the optical receiver is estimated by comparing the second data where the transmission path characteristics is compensated with a second known signal before transmission, or comparing the second data where the transmission path characteristics is not compensated with a second known signal before transmission to which the transmission path characteristics is added, and in a case where the second known signal is not compensated with the average transfer function or the average inverse transfer function of the optical transmitter on the transmission side in advance, a transfer function or an inverse transfer function of the optical receiver is estimated by comparing the second data where at least one or none of the average transfer function of the optical transmitter and the transmission path characteristics is compensated, with a second known signal before transmission to which what is not compensated for the second data between the average transfer function of the optical transmitter and the transmission path characteristics is added.

11. The optical transmission characteristics estimation system according to claim 9, wherein the multiple frequency offsets are set so as to divide, into two or more, a variation period in a frequency direction of phase characteristics of the transfer function or the inverse transfer function of the optical transmitter estimated to an initial frequency offset.

12. The optical transmission characteristics estimation system according to claim 9, wherein the transmitter transfer function estimator is configured to input the first data transmitted from the transmitter to the receiver, obtained by compensating transmission path characteristics and a transfer function of the optical receiver, and having a remaining effect of a transfer function of the optical transmitter into the digital filter, and estimates the transfer function or the inverse transfer function of the optical transmitter as a filter coefficient of the digital filter in a case of convergence with an error with a first known signal before transmission, being minimized.

13. The optical transmission characteristics estimation system according to claim 10, wherein in a case where the second known signal is compensated with the average transfer function or the average inverse transfer function of the optical transmitter on a transmission side in advance, the first receiver transfer function estimator is configured to input the second data into a digital filter and is configured to estimate the transfer function or the inverse transfer function of the optical receiver as a filter coefficient of the digital filter in a case of convergence with an error between an output of the digital filter and a signal obtained by adding transmission path characteristics to the second known signal before transmission being minimized.

14. The optical transmission characteristics estimation system according to claim 9, further comprising a second receiver transfer function estimator estimating a temporary transfer function or a temporary inverse transfer function of the optical receiver only in the receiver.

15. The optical transmission characteristics estimation system according to claim 14, wherein the second receiver transfer function estimator is configured to estimate the temporary transfer function or the temporary inverse transfer function of the optical receiver from third data output from the optical receiver when a test signal having a known spectrum is input into an input end of the optical receiver.

16. The optical transmission characteristics estimation system according to claim 9, wherein the transmitter transfer function estimator is configured to set the temporary transfer function of the optical receiver to 1 and is configured to perform estimating a transfer function or an inverse transfer function of the optical transmitter.

17. An optical transmission characteristics compensation system comprising:

an optical transmission characteristics estimation system comprising a transmitter transfer function estimator estimating transmission characteristics of an optical transmitter of a transmitter and an optical receiver of a receiver connected to each other via an optical transmission path, wherein carrier frequency of at least one of the optical transmitter and the optical receiver is variable, the transmitter transfer function estimator is configured to perform estimating a transfer function or an inverse transfer function of the optical transmitter, from first data obtained by the optical receiver when a first known signal is transmitted from the transmitter to the receiver, and a temporary transfer function or a temporary inverse transfer function of the optical receiver, for multiple frequency offsets between the optical transmitter and the optical receiver, and an average transfer function or an average inverse transfer function of the optical transmitter is obtained by averaging the transfer functions or the inverse transfer functions of the optical transmitter estimated for the multiple frequency offsets, or averaging and exponentially representing phase characteristics $\Phi(s)$ of the transfer functions or the inverse transfer functions of the optical transmitter estimated for the multiple frequency offsets where s represents a variable indicating frequency, $|T(s)|$ represents an amplitude component of transfer function of the optical transmitter, $\Phi(s)$ represents phase characteristics, and $|T(s)|\times\exp(j\Phi(s))$ represents the transfer function of the optical transmitter, and the transfer function or the inverse transfer function of the optical transmitter is estimated by comparing the first data for which at least one or none of the temporary transfer function of the optical receiver and transmission path characteristics detected in the receiver is compensated, with a first known signal before transmission to which what is not compensated for the first data between the temporary transfer function of the optical receiver and the transmission path characteristic is added; and a transmitter compensator using the estimated average transfer function or the estimated average inverse transfer function of the optical transmitter and compensating transmission characteristics of the optical transmitter.

18. An optical transmission characteristics compensation system comprising:

the optical transmission characteristics estimation system according to claim 10; and a receiver compensator using the estimated transfer function or the estimated inverse transfer function of the optical receiver and compensating transmission characteristics of the optical receiver.

* * * * *